(12) United States Patent
Fox et al.

(10) Patent No.: US 11,128,737 B1
(45) Date of Patent: Sep. 21, 2021

(54) DATA MODEL MONITORING SYSTEM

(71) Applicant: MASSACHUSETTS MUTUAL LIFE INSURANCE COMPANY, Springfield, MA (US)

(72) Inventors: Adam Fox, Springfield, MA (US); Sears Merritt, Groton, MA (US); Xiangdong Gu, Springfield, MA (US); Xiaomin Lin, Springfield, MA (US); Hayley Carlotto, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 0 days.

(21) Appl. No.: 17/003,690

(22) Filed: Aug. 26, 2020

Related U.S. Application Data

(60) Provisional application No. 62/893,055, filed on Aug. 28, 2019.

(51) Int. Cl.
| | | |
|---|---|---|
| *H04L 29/08* | (2006.01) | |
| *G06N 3/08* | (2006.01) | |
| *H04L 12/58* | (2006.01) | |
| *G06K 9/62* | (2006.01) | |

(52) U.S. Cl.
CPC ............ *H04L 67/34* (2013.01); *G06K 9/6296* (2013.01); *G06N 3/08* (2013.01); *H04L 51/04* (2013.01)

(58) Field of Classification Search
CPC ........ G06K 9/6296; G06N 3/08; H04L 51/04; H04L 67/34
See application file for complete search history.

(56) References Cited

U.S. PATENT DOCUMENTS

| 10,977,729 | B2* | 4/2021 | Kamkar | G06N 3/084 |
|---|---|---|---|---|
| 2016/0358106 | A1* | 12/2016 | Anderson | G06N 3/08 |
| 2018/0158552 | A1* | 6/2018 | Liu | G06N 3/0454 |
| 2020/0012917 | A1* | 1/2020 | Pham | G06F 16/2237 |
| 2020/0174486 | A1* | 6/2020 | Luo | B60W 60/0011 |
| 2020/0272853 | A1* | 8/2020 | Zoldi | G06K 9/6226 |
| 2020/0302250 | A1* | 9/2020 | Chu | G06K 9/00651 |
| 2021/0012190 | A1* | 1/2021 | Murali | G06N 3/08 |

FOREIGN PATENT DOCUMENTS

WO   WO-2019019291 A1 *   1/2019   ............ G07G 1/0036

* cited by examiner

*Primary Examiner* — Kostas J Katsikis
(74) *Attorney, Agent, or Firm* — Foley & Lardner LLP

(57) ABSTRACT

Disclosed herein is an artificial intelligence data model monitoring and management system. The artificial intelligence data model monitoring and management system is configured to monitor and detect any changes in data quality of new data associated with an artificial intelligence data model with respect to historical data used to build the artificial intelligence data model. The system may update the artificial intelligence data model when the data quality of the new data does not satisfy a predetermined threshold.

20 Claims, 15 Drawing Sheets

302 — Performance Analysis

| model_id | Start_date | end-date | metric_name | metric_value |
|---|---|---|---|---|
| SM-SignUp-1.0 | 2017-04-11 | 2017-19-09 | AUC | 0.5326566972775606 |
| SM-SignUp-1.0 | 2017-01-18 | 2017-02-28 | AUC | 0.6246434146642942 |
| SM-SignUp-1.0 | 2017-02-28 | 2017-03-28 | AUC | 0.5989279766632496 |
| SM-SignUp-1.0 | 2017-09-19 | 2017-10-18 | AUC | 0.6490391951677253 |
| SM-SignUp-1.0 | 2017-10-18 | 2014-12-30 | AUC | 0.6708010115631199 |
| SM-SignUp-1.0 | 2017-03-28 | 2017-04-11 | AUC | 0.5853255790822445 |

304 — Trend of Selected Metric

306 — Trend of Profit

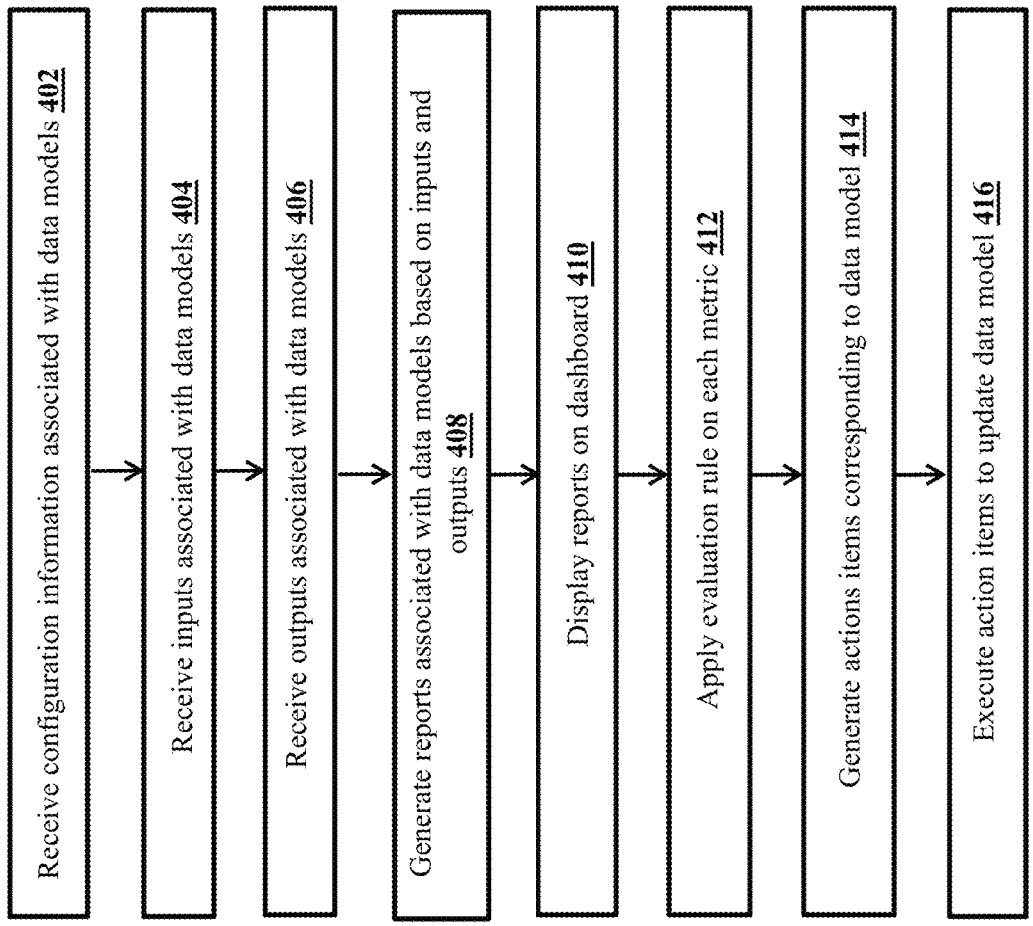

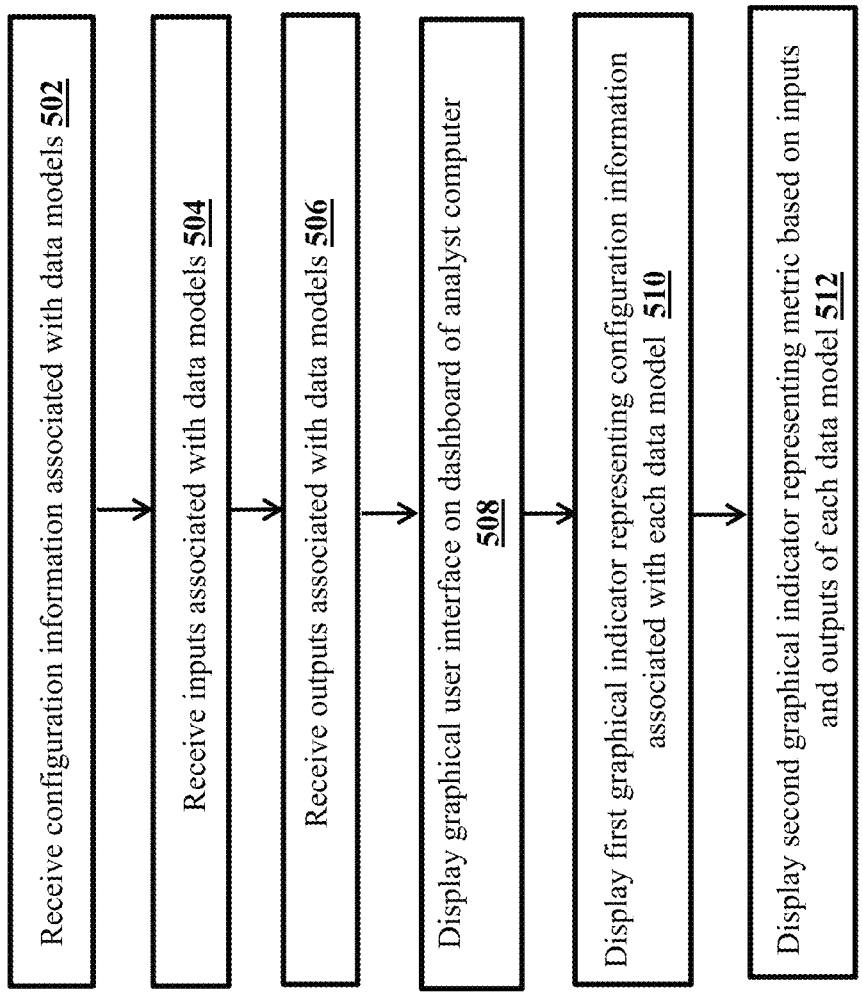

DATA MODEL MONITORING SYSTEM

CROSS REFERENCE TO RELATED APPLICATIONS

This applications claims priority to U.S. provisional application No. 62/893,055, filed Aug. 28, 2020, which is incorporated herein by reference in its entirety for all purposes.

TECHNICAL FIELD

The subject matter described herein relates generally to data model management system, and more specifically directed towards systems and methods for real time monitoring and evaluation of new data associated with various versions of multiple artificial intelligence data models.

BACKGROUND

In today's technological environment, companies are increasingly looking to automate processes and systems for the benefit of error reduction, cost, and time efficiency. For this purpose, many companies today are using artificial intelligence data models to support a variety of business applications, such as, customer retention, identifying potential customers, and fraud detection. The artificial intelligence data models may use historical data along with machine learning algorithms to provide predictive analytics for the business applications. The results from the predictive analytics usually assist the companies to precisely predict their business outcomes.

In many instances, the artificial intelligence data models may experience relatively different inputs compared to the ones that were used in the historical and training data. This may cause output performance of the artificial intelligence data models to suffer. However, as many of the significant business applications are now being supported by the artificial intelligence data models, it is desired that all the artificial intelligence data models constantly function properly, so that the business applications being supported can provide adequate and accurate results.

SUMMARY

What is therefore needed is an artificial intelligence data model monitoring and management system, which is configured to monitor and detect any changes in new data being ingested by the artificial intelligence data models with respect to historical data used to build the artificial intelligence data models. The artificial intelligence data model monitoring and management system may generate feedback notifications and alerts when data quality of the new data does not satisfy a predetermined threshold. The artificial intelligence data model monitoring and management system may present the feedback notifications and the alerts to analysts on a specialized and interactive dashboard. The artificial intelligence data model monitoring and management system may update or rebuild the artificial intelligence data models when the data quality of the new data does not satisfy the predetermined threshold.

In an embodiment, a server-implemented method comprises receiving, by a server, configuration information associated with a plurality of artificial intelligence data models, the configuration information comprising a set of rules associated with each artificial intelligence data model; receiving, by the server, a plurality of inputs associated with each of the plurality of artificial intelligence data models over a predetermined period of time; receiving, by the server, a plurality of outputs generated by each of the plurality of artificial intelligence data models corresponding to the plurality of inputs over the predetermined period of time; and displaying, by the server, an interactive graphical user interface on a computer, the interactive graphical user interface comprising: a first graphical indicator representing the configuration information associated with each artificial intelligence data model; a second graphical indicator representing a metric generated based on the plurality of inputs and plurality of outputs, wherein the metric is displayed in form of a graph, and wherein the computer continuously updates the graph associated with the metric by continuously receiving and using a latest input and output from each artificial intelligence data model; and a third graphical indicator representing an attribute of a training dataset used to train each artificial intelligence data model.

In another embodiment, a server comprises a processor and a non-transitory computer-readable medium containing instructions that when executed by the processor causes the processor to perform operations comprises receive configuration information associated with a plurality of artificial intelligence data models, the configuration information comprising a set of rules associated with each artificial intelligence data model and a version number of each artificial intelligence data model; receive a plurality of inputs associated with each of the plurality of artificial intelligence data models over a predetermined period of time; receive a plurality of outputs generated by each of the plurality of artificial intelligence data models corresponding to the plurality of inputs over the predetermined period of time; and display an interactive graphical user interface on a computer, the interactive graphical user interface comprising: a first graphical indicator representing the configuration information associated with each artificial intelligence data model; a second graphical indicator representing a metric generated based on the plurality of inputs and plurality of outputs, wherein the metric is displayed in form of a graph, and wherein the computer continuously updates the graph associated with the metric by continuously receiving and using a latest input and output from each artificial intelligence data model; and a third graphical indicator representing an attribute of a training dataset used to train each artificial intelligence data model.

In yet another embodiment, a server-implemented method comprises receiving, by a server, configuration information associated with a plurality of artificial intelligence data models, the configuration information comprising a set of rules associated with each artificial intelligence data model and a version number of each artificial intelligence data model, each artificial intelligence data model is trained using training data; receiving, by the server, a plurality of inputs associated with each artificial intelligence data model over a predetermined period of time; receiving, by the server, a plurality of outputs generated by each artificial intelligence data model corresponding to the plurality of inputs over the predetermined period of time; generating, by the server, one or more reports associated with each artificial intelligence data model showing an interrelationship between the plurality of inputs and the plurality of outputs; displaying, by the server on an interactive dashboard interface of a computer, the one or more reports associated with each artificial intelligence data model; apply, by the server, an evaluation rule on each metric associated with the one or more reports to determine whether the evaluation rule is satisfied; upon determining that the evaluation rule is not satisfied, generating, by the server, one or more action items associated with each artificial intelligence data model, wherein the one or more action items comprises updating the training data associated with each artificial intelligence data model; and executing, by the server, the one or more action items to update the training data associated with each artificial intelligence data model.

It is to be understood that both the foregoing general description and the following detailed description are exemplary and explanatory, and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 3C shows a first report displayed on an interactive dashboard, according to an embodiment.

FIG. 4 shows a method for real time monitoring of data associated with various versions of multiple artificial intelligence data models, according to an embodiment.

FIG. 5 shows a method for real time monitoring of data associated with various versions of multiple artificial intelligence data models, according to an embodiment.

DETAILED DESCRIPTION

Figure 1:
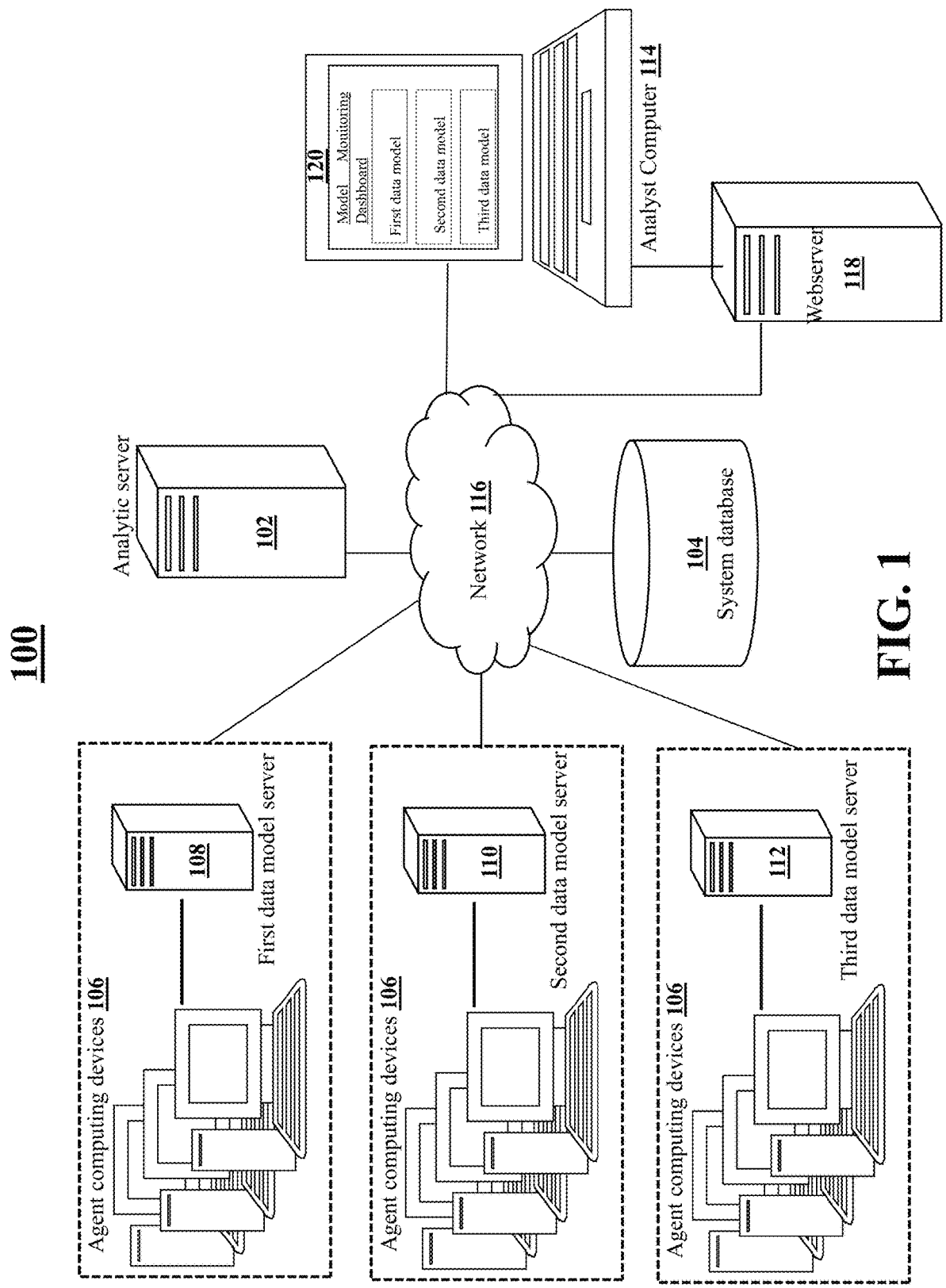
FIG. 1 shows various components of a system for real time monitoring of data associated with various versions of multiple artificial intelligence data models, according to an embodiment.

The subject matter described herein may provide an artificial intelligence data model monitoring and management system. The artificial intelligence data model monitoring and management system may provide real time monitoring of new data being fed into multiple artificial intelligence data models. The artificial intelligence data model monitoring and management system may include model monitoring tools and applications to provide the real time monitoring of new data being fed into the various versions of the multiple artificial intelligence data models. The model monitoring tools and applications may enable evaluation, analytics and reporting of data quality parameters associated with the new data across the various versions of the multiple artificial intelligence data models. The model monitoring tools and applications may provide multiple analytic features. The analytic features may be available by a metric name and a model version number over different time periods (for example, daily, monthly, quarterly, or yearly) and comparable periods (for example, month over month, quarter over quarter, or year over year).

Hardware components and software algorithms of the artificial intelligence data model monitoring and management system, which are associated with the model monitoring tools and applications, may collect input data records and output data records associated with each of the multiple artificial intelligence data models. The hardware components and the software algorithms may process and evaluate the input data records and the output data records, based on one or more predetermined evaluation rules. The data monitoring tools and applications may provide a user with a report, such as a data quality comparison report. The data quality comparison report may be created by processing and evaluating information associated with the input data records and the output data records, in accordance with the predetermined evaluation rules.

The artificial intelligence data model monitoring and management system may provide a specialized interactive dashboard on a computing device of an analyst of a company employing the multiple artificial intelligence data models. The interactive dashboard interface may graphically may present the data quality comparison report of each artificial intelligence data model. The analyst may examine each data quality comparison report in order to assess each artificial intelligence data model. The data monitoring tools and applications may include features, which may provide the analyst an ability to analyze each artificial intelligence data model across current and historical performance by version number, product type, and time period.

When data quality of the new data associated with the artificial intelligence data models is not satisfactory with respect to historical data associated with the artificial intelligence data models, an analytic server may update or rebuild the artificial intelligence data models in order to correct problems related to poor data quality associated with the new data of the artificial intelligence data models. The analytic server may rebuild the artificial intelligence data models when a score associated with the data quality of the new data does not satisfy a first predetermined threshold. The analytic server may update training datasets associated with the artificial intelligence data models when the score associated with the data quality of the new data does not satisfy a second predetermined threshold. The analytic server may further reconfigure a neutral network associated with the artificial intelligence data models, which may result in updating a framework for multiple machine learning algorithms to work together and process complex data inputs. The updating of the artificial intelligence data models may result in improved and desired performance of the artificial intelligence data models. The model monitoring tools and applications may continue to monitor and evaluate the data quality of new data being fed into modified artificial intelligence data models, and update or rebuild the modified artificial intelligence data models until the data quality of the new data is satisfactory.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

FIG. 1 show various components of a system 100. The system 100 may be an artificial intelligence data model monitoring and management system for real time monitoring of data quality of datasets associated with various versions of multiple artificial intelligence data models. The system 100 may include an analytic server 102, a system database 104, agent computing devices 106, a first data model server 108, a second data model server 110, a third data model server 112, and an analyst computer 114 comprising an interactive graphical user interface 120. The first data model server 108 is associated with a first artificial intelligence data model. The second data model server 110 is associated with a second artificial intelligence data model. The third data model server 112 is associated with a third artificial intelligence data model.

The analytic server 102, the system database 104, the agent computing devices 106, the first data model server 108, the second data model server 110, the third data model server 112, and the analyst computer 114 communicate with each other over a network 116. The network 116 may include, but is not limited to, private or public local area network, wireless local area network, metropolitan area network, wide-area network, and the Internet. The network 116 may further include both wired and wireless communications according to one or more standards via one or more transport mediums. The communication over the network 116 may be performed in accordance with various communication protocols such as transmission control protocol and internet protocol, user datagram protocol, and institute of electrical and electronics engineers communication protocols. The network 116 may further include wireless communications according to Bluetooth specification sets, or another standard or proprietary wireless communication protocol. The network 116 may further include communications over a cellular network, including, for example, a global system for mobile communications, code division multiple access, and enhanced data for global evolution network.

In operation, an analyst computer 114 may communicate with an analytic server 102 via a communication network 116, such as the Internet. An analyst operating the analyst computer 114 may install a model evaluation software application on the analyst computer 114. The model evaluation software application may implement an interactive graphical user interface 120, which may include controls operable by the analyst to interact with multiple features of the model performance evaluation software application. The controls may include buttons, menus, pull-down menus, dialog boxes, scroll bars, and other controls, which may enable the analyst to view the model evaluation software application data, invoke the model evaluation software application functionality, and interact with the model evaluation software application. A visual representation of the model evaluation software application may be generated by rendering the user interface state of the model evaluation software application in a program, for example, a web browser running on the analyst computer 114.

The analyst may execute the model evaluation software application to generate a request. The model evaluation software application may notify the analytic server 102 to derive various forms of analytical information from data records associated with request. The data records may include input data records and output data records associated with various artificial intelligence data models (such as a first artificial intelligence data model, a second artificial intelligence data model, and a third artificial intelligence data model). The data records may further include training datasets associated with the various artificial intelligence data models. The training datasets may include training data and training data records. The analytic server 102 may retrieve the data records associated with the request from data model servers (such as the first data model server 108, the second data model server 110, the third data model server 112) and/or the agent computing devices 106. The analytic server 102 may store the data records in the system database 104.

The analytic server 102 may process the data records, in accordance with one or more evaluation rules. The analytic server 102 may store processed data records in the system database 104. The analytic server 102 may perform various analytics on the processed data records, in accordance with instructions from the analyst computer 114. The analytic server 102 may store analyzed data records in the system database 104. The analytic server 102 may generate a model evaluation report using the analyzed data records. The model evaluation report may at least include a score for each artificial intelligence data model. The analytic server 102 may present the model evaluation report on the interactive graphical user interface 120 of the analyst computer 114. The analyst may use an input device associated with the analyst computer 114 to interact with information and graphical components of the model evaluation report.

The analytic server 102 may update one or more artificial intelligence data models in response to evaluation of the model evaluation report. For instance, when the score associated with the one or more artificial intelligence data models does not satisfy a threshold value, the analytic server 102 may update the one or more artificial intelligence data models. The analytic server 102 may update the data records and the training datasets associated with each of the one or more artificial intelligence data models, and train each of the one or more artificial intelligence data models with corresponding updated training datasets.

The analytic server 102 may further update a neutral network associated with the one or more artificial intelligence data models. The updating of the neutral network associated with each of the one or more artificial intelligence data models may include reconfiguring arrangement of various nodes of the neutral network associated with each of the one or more artificial intelligence data models. The reconfiguration of the neutral network associated with each of the one or more artificial intelligence data models may result in the modification of a framework for multiple machine learning algorithms to work together and process complex data inputs.

The analytic server 102 may continue to monitor the data records associated with each of one or more updated artificial intelligence data models and evaluate data quality of the data records associated with each of one or more updated artificial intelligence data models. The analytic server 102 may update each of the one or more updated artificial intelligence data models until a value associated with the data quality of each of one or more updated artificial intelligence data models satisfy the threshold value.

A first data model server 108 is associated with the first artificial intelligence data model. The first artificial intelligence data model may be a linear model, such as a linear regression model. The first artificial intelligence data model may also be a tree based model, such as a random forest regression model and a decision tree model. The first artificial intelligence data model may be a generalized additive model (GAM), which is a generalized linear model.

The first data model server 108 may execute statistical tools and artificial intelligence techniques to generate the first artificial intelligence data model. In some embodiments, the analytic server 102 may execute the statistical tools and the artificial intelligence techniques to generate the first artificial intelligence data model. The first artificial intelligence data model is associated with a first application. The first application is associated with a customer retention application.

The first data model server 108 may use attributes associated with customer retention application information to generate the first artificial intelligence data model. The attributes may include specifications of various training datasets associated with the customer retention application information. The training datasets may include customer incentive records, loyalty history records, and transaction history records.

The first data model server 108 may execute an artificial neural network technique to train the first artificial intelligence data model. The first data model server 108 may train the first artificial intelligence data model based on indicators obtained from the specifications of the training datasets. The first data model server 108 may continuously re-train the first artificial intelligence data model based on updated training datasets.

The first artificial intelligence data model may include a neural network. The neural network may include a plurality of network nodes. Each network node may be associated with at least one attribute of the customer retention information application. The attributes of the customer retention information application may include customer incentive attributes, loyalty history attributes, and transaction history attributes. The customer incentive attributes may correspond to different types and number of incentives offered to and used by the customer. The loyalty history attributes may correspond to a length of time the customer has held an account. The transaction history attributes may correspond to a size and a frequency of transactions conducted with the account. The first data model server 108 may configure the neural network, in accordance with one or more machine-learning algorithms. The one or more machine learning algorithms may together form a framework to work together, and process complex data inputs.

The neural network may include an interconnected group of artificial neurons where each neuron may represent an attribute. For example, a first neuron may represent one attribute associated with a customer incentive record, which is stored within a first database associated with the first data model server 108. A second neuron may represent one attribute with a loyalty history record stored within the first database. A third neuron may represent one attribute with a transaction history record stored within the first database.

The first data model server 108 may generate the first artificial intelligence data model using the neural network of the neurons. For instance, the first data model server 108 may configure the neural network, in accordance with a training dataset comprising historical data. The first data model server 108 may retrieve the historical data, and their corresponding attributes. Based on the retrieved data, the first data model server 108 may configure and arrange the neurons or nodes of the neural network. Each connection in the neutral network may transmit a signal from one neuron to another neuron. The neuron that receives a signal can process the signal, and then transmit processed signal output to further neurons connected to it. When the configuration of the neutral network is changed, the connections between the neurons is also changed. This may result in changing the interaction of signals between the neurons, which may result in changing the process of generating an output of the first artificial intelligence data model.

The first artificial intelligence data model may represent a mathematical or computational model. The first artificial intelligence data model may include mathematical functions. The mathematical functions may describe a relationship between each neuron within the neural network using weight and bias factors. The first artificial intelligence data model may include a mathematical function describing how the neurons are divided into one or more layers. Each layer may perform different kinds of transformations on their signal inputs.

The first data model server 108 may generate the first artificial intelligence data model using logistic regression and gradient boosting tree. For instance, the first artificial intelligence data model may be implemented using statistical models, such as, weighted least square regression model, gradient boosting regression model, and gradient boosting classification model. The first data model server 108 may use the weighted least square regression model to generate the first artificial intelligence data model. The weighted least square regression model may use each data point (such as a customer incentive attribute, a loyalty history attribute, and a transaction history attribute) having equally precise information. The weighted least square regression model may allow for making different types of easily interpretable effect estimations, recommendations, and predictions.

The first data model server 108 may use gradient boosting regression model to generate the first artificial intelligence data model. The gradient boosting regression model is a machine-learning model. Based on a decision tree, the first data model server 108 may add new models to the ensemble sequentially. During each iteration, the first data model server 108 may train a new decision tree with respect to an error rate of whole ensemble from previous steps. In the gradient boosting regression model, the first data model server 108 may use same predictors, which are used to predict the customer retention. The first data model server 108 may optimize data quality associated with the first artificial intelligence data model by tuning different parameters, such as, depth of tree, learning rate, and number of trees.

The first data model server 108 may generate a source code of a computer program, of the first artificial intelligence data model, from specifications of the training datasets associated with customer retention attributes, such as, customer incentive attributes, loyalty history attributes, and transaction history attributes. The first data model server 108 may utilize a compiler to generate the source code of the computer program of the first artificial intelligence data model from the specifications. The first data model server 108 may generate one or more instructions, and transmit the one or more instructions to the compiler to generate the source code of the computer program of the first artificial intelligence data model. The compiler may compile language statements specifying software components corresponding to the training datasets where each training dataset is being specified by a collection of language statements. The first data model server 108 may use the specification language to specify the training datasets in a context fashion. The first data model server 108 may store the specification in a file within the first database. The first data model server 108 may invoke the compiler to process the file. The process results in the storage of the compiled specification in the first database. The compiler may construct a symbol table and a parse tree, and may store the symbol table and the parse tree in the first database. The first data model server 108 may use above-mentioned information to generate program segments for the first artificial intelligence data model.

A second data model server 110 is associated with the second artificial intelligence data model. The second artificial intelligence data model may be a linear model, such as a linear regression model. The second artificial intelligence data model may also be a tree based model, such as a random forest regression model and a decision tree model. The second artificial intelligence data model may be a generalized additive model (GAM), which is a generalized linear model.

The second data model server 110 may execute statistical tools and artificial intelligence techniques to generate the second artificial intelligence data model. In some embodiments, the analytic server 102 may execute the statistical tools and the artificial intelligence techniques to generate the second artificial intelligence data model. The second artificial intelligence data model is associated with a second application. The second application is associated with a potential customer identification application.

The second data model server 110 may use attributes associated with the potential customer identification application information to generate the second artificial intelligence data model. The attributes may include specifications of various training datasets associated with the potential customer identification application information. The training datasets may include customer inquiries records and product marketing records.

The second data model server 110 may execute an artificial neural network technique to train the second artificial intelligence data model. The second data model server 110 may train the second artificial intelligence data model based on indicators obtained from the specifications of the training datasets. The second data model server 110 may continuously re-train the second artificial intelligence data model based on updated training datasets.

The second artificial intelligence data model may include a neural network. The neural network may include a plurality of network nodes. Each network node may be associated with at least one attribute of the potential customer identification application. The attributes of the potential customer identification application information may include product marketing attributes and customer inquiries attributes. The product marketing attributes may correspond to different types of advertisements, promotions, and offers being offered to potential customers. The customer inquiries attributes may correspond to different types of communication channels through which a customer can communicate with a company. The second data model server 110 may configure the neural network in accordance with one or more machine-learning algorithms. The one or more machine learning algorithms may together form a framework to work together, and process complex data inputs.

The neural network may include an interconnected group of artificial neurons where each neuron may represent an attribute. For example, a first neuron may represent one attribute associated with a product marketing record, which is stored within a second database associated with the second data model server 110. A second neuron may represent one attribute with a customer inquiry record stored within the second database.

The second data model server 110 may generate the second artificial intelligence data model using the neural network of the neurons. For instance, the second data model server 110 may configure the neural network, in accordance with a training dataset comprising historical data. The second data model server 110 may retrieve the historical data, and their corresponding attributes. Based on the retrieved data, the second data model server 110 may configure and arrange the neurons or nodes of the neural network. Each connection in the neutral network transmit a signal from one neuron to another neuron. The neuron that receives a signal can process the signal, and then transmit processed signal output to further neurons connected to it. When the configuration of the neutral network is changed, the connections between the neurons is also changed. This may result in changing the interaction of signals between the neurons, which may result in changing the process of generating an output of the artificial intelligence data model.

The second artificial intelligence data model may represent a mathematical or computational model. The second artificial intelligence data model may include mathematical functions. The mathematical functions may describe a relationship between each neuron within the neural network using weight and bias factors. The second artificial intelligence data model may include a mathematical function describing how the neurons are divided into one or more layers. Each layer may perform different kinds of transformations on their signal inputs.

The second data model server 110 may generate the second artificial intelligence data model using logistic regression and gradient boosting tree. For instance, the second artificial intelligence data model may be implemented using statistical models, such as, weighted least square regression model, gradient boosting regression model, and gradient boosting classification model. The second data model server 110 may use the weighted least square regression model to generate the second artificial intelligence data model. The weighted least square regression model may use each data point (such as a product marketing attribute and a customer inquiry attribute) having equally precise information. The weighted least square regression model may allow for making different types of easily interpretable effect estimations, recommendations, and predictions.

The second data model server 110 may use gradient boosting regression model to generate the second artificial intelligence data model. The gradient boosting regression model is a machine-learning model. Based on a decision tree, the second data model server 110 may add new models to the ensemble sequentially. During each iteration, the second data model server 110 may train a new decision tree with respect to an error rate of whole ensemble from previous steps. In the gradient boosting regression model, the second data model server 110 may use same predictors, which are used to predict the customer retention. The second data model server 110 may optimize the data quality associated with the second artificial intelligence data model by tuning different parameters, such as, depth of tree, learning rate and number of trees.

The second data model server 110 may generate a source code of a computer program of the second artificial intelligence data model from specifications of the training datasets associated with customer retention application attributes, such as, product marketing attributes and customer inquiry attributes. The second data model server 110 may utilize a compiler to generate the source code of the computer program of the second artificial intelligence data model from the specifications. The second data model server 110 may generate one or more instructions, and transmit the one or more instructions to the compiler to generate the source code of the computer program of the second artificial intelligence data model. The compiler may compile language statements specifying software components corresponding to the training datasets where each training dataset is being specified by a collection of language statements. The second data model server 110 may use the specification language to specify the training datasets in a context fashion. The second data model server 110 may store the specification in a file within the second database. The second data model server 110 may invoke the compiler to process the file. The process results in the storage of the compiled specification in the second database. The compiler may construct a symbol table and a parse tree, and stores the symbol table and the parse tree in the second database. The second data model server 110 may use above-mentioned information to generate program segments for the second artificial intelligence data model.

A third data model server 112 is associated with the third artificial intelligence data model. The third artificial intelligence data model may be a linear model, such as a linear regression model. The third artificial intelligence data model may also be a tree based model, such as a random forest regression model and a decision tree model. The third artificial intelligence data model may be a generalized additive model (GAM), which is a generalized linear model.

The third data model server 112 may execute statistical tools and artificial intelligence techniques to generate the third artificial intelligence data model. In some embodiments, the analytic server 102 may execute the statistical tools and the artificial intelligence techniques to generate the third artificial intelligence data model. The third artificial intelligence data model is associated with a third application. The third application is associated with a fraud detection application.

The third data model server 112 may use attributes associated with the fraud detection application information to generate the third artificial intelligence data model. The attributes may include specifications of various training datasets associated with the fraud detection application information. The training datasets may include transaction location records and background check records.

The third data model server 112 may execute an artificial neural network technique to train the third artificial intelligence data model. The third data model server 112 may train the third artificial intelligence data model based on indicators obtained from the specifications of the various training datasets. The third data model server 112 may continuously re-train the third artificial intelligence data model based on updated training datasets.

The third artificial intelligence data model may include a neural network. The neural network may include a plurality of network nodes. Each network node may be associated with at least one attribute of the fraud detection application. The attributes of the fraud detection application information may include transaction location attributes and background check attributes. The transaction location attributes may correspond to geographical locations of transactions and types of transactions in different geographical locations. The background check attributes may correspond to different types of background checks, such as, social security check and criminal record check. The third data model server 112 may configure the neural network in accordance with one or more machine-learning algorithms. The one or more machine learning algorithms may together form a framework to work together, and process complex data inputs.

The neural network may include an interconnected group of artificial neurons where each neuron may represent an attribute. For example, a first neuron may represent one attribute associated with a transaction location record stored within a third database, which is associated with the third data model server 112. A second neuron may represent one attribute with a background check record stored within the third database.

The third data model server 112 may generate the third artificial intelligence data model using the neural network of the neurons. For instance, the third data model server 112 may configure the neural network, in accordance with a training dataset comprising historical data. The third data model server 112 may retrieve the historical data, and their corresponding attributes. Based on the retrieved data, the third data model server 112 may configure and arrange the neurons or nodes of the neural network. Each connection in the neutral network transmit a signal from one neuron to another neuron. The neuron that receives a signal can process the signal, and then transmit processed signal output to further neurons connected to it. When the configuration of the neutral network is changed, the connections between the neurons is also changed. This may result in changing the interaction of signals between the neurons, which may result in changing the process of generating an output of the third artificial intelligence data model.

The third artificial intelligence data model may represent a mathematical or computational model. The third artificial intelligence data model may include mathematical functions. The mathematical functions may describe a relationship between each neuron within the neural network using weight and bias factors. The third artificial intelligence data model may include a mathematical function describing how the neurons are divided into one or more layers. Each layer may perform different kinds of transformations on their signal inputs.

The third data model server 112 may generate the third artificial intelligence data model using logistic regression and gradient boosting tree. For instance, the third artificial intelligence data model may be implemented using statistical models, such as, weighted least square regression model, gradient boosting regression model, and gradient boosting classification model. The third data model server 112 may use the weighted least square regression model to generate the third artificial intelligence data model. The weighted least square regression model may use each data point (such as a transaction location attribute and a background check attribute) having equally precise information. The weighted least square regression model may allow for making different types of easily interpretable effect estimations, recommendations, and predictions.

The third data model server 112 may use gradient boosting regression model to generate the third artificial intelligence data model. The gradient boosting regression model is a machine learning model. Based on a decision tree, the third data model server 112 may add new models to the ensemble sequentially. During each iteration, the third data model server 112 may train a new decision tree with respect to an error rate of whole ensemble from previous steps. In the gradient boosting regression model, the third data model server 112 may use same predictors, which are used to predict the customer retention. The third data model server 112 may optimize the data quality associated with the third artificial intelligence data model by tuning different parameters, such as depth of tree, learning rate and number of trees.

The third data model server 112 may generate a source code of a computer program of the third artificial intelligence data model from specifications of training datasets associated with fraud detection application attributes, such as, transaction location attributes and background check attributes. The third data model server 112 may utilize a compiler to generate the source code of the computer program of the third artificial intelligence data model from the specifications. The third data model server 112 may generate one or more instructions, and transmit the one or more instructions to the compiler to generate the source code of the computer program of the third artificial intelligence data model. The compiler may compile language statements specifying software components corresponding to the training datasets where each training dataset is being specified by a collection of language statements. The third data model server 112 may use the specification language to specify the training datasets in a context fashion. The third data model server 112 may store the specification in a file within the third database. The third data model server 112 may invoke the compiler to process the file. The process results in the storage of the compiled specification in the third database. The compiler may construct a symbol table and a parse tree, and stores the symbol table and the parse tree in the third database. The third data model server 112 may use above-mentioned information to generate program segments for the third artificial intelligence data model.

An analytic server 102 is a computing device. The analytic server 102 may include a processing unit, and a non-transitory machine-readable storage medium. The processing unit may include a processor with a computer-readable medium, such as, a random access memory coupled to the processor. The analytic server 102 may execute algorithms or computer executable program instructions, which may be executed by a single processor or multiple processors in a distributed configuration. The analytic server 102 may be configured to interact with one or more software modules of a same or different type operating within the system 100.

Non-limiting examples of the processor may include a microprocessor, an application specific integrated circuit, and a field programmable object array, among others. The analytic server 102 is capable of executing data processing tasks and data analysis tasks. Non-limiting examples of the analytic server 102 may include a desktop computer, a server computer, a laptop computer, a tablet computer, and the like. For ease of explanation, the FIG. 1 shows a single server computing device functioning as the analytic server 102. However, some embodiments may include a plurality of server computing devices capable of performing the tasks described herein.

The analytic server 102 may be coupled to the system database 104, data model servers (such as, the first data model server 108, the second data model server 110, the third data model server 112), the agent computing devices 106, and the analyst computer 114 via the one or more internal or external networks 116. When a web connection is established, the analytic server 102 is able to receive data records from the data model servers and/or the agent computing devices 106. The data records may include input data records and output data records associated with various artificial intelligence data models. The data records may further include training datasets associated with various artificial intelligence data models. The training datasets may include multiple sets of training data. The analytic server 102 may store the data records in the system database 104. At the same time, the analytic server 102 is able to transmit processed data records to the analyst computer 114 and receive any information from the analyst computer 114. The analytic server 102 may store the processed data records in the system database 104.

The analytic server 102 may receive a query from a model evaluation software application. The query may include a request for a model evaluation report containing data quality analysis of certain artificial intelligence data models. The analytic server 102 may parse the query. The analytic server 102 may then retrieve the data records relevant to information within the query.

The analytic server 102 may retrieve the data records from the data model servers and/or databases associated with the data model servers. In some cases, the analytic server 102 may receive the data records from the data model servers and/or the databases associated with the data model servers. The analytic server 102 may execute one or more software modules to consume (for example, retrieve/pull, receive) the data records from the data model servers and/or the databases associated with the data model servers. The software modules may be configured to receive or pull the data records from particular data model servers and/or the databases associated with the data model servers, as required by the particular data model servers. In some cases, a data model server may be configured to transmit the data records at regular interval, using a data transfer protocol.

The analytic server 102 may generate a notification upon obtaining the data records from the data model servers and/or the databases associated with the data model servers. The analytic server 102 may store the notification in the system database 104. The notification may include an electronic message containing information associated with a date and a time of receipt of the data records. The electronic message may further include information associated with a number of the data records.

The analytic server 102 may process the data records. The analytic server 102 may execute one or more processing algorithms on portions or all of the data records to format and clean the data records, and generate processed data records. The processing algorithms may be computer files stored on a local database associated with the analytic server 102. Upon execution of the processing algorithms, the analytic server 102 may identify data field entries in the data records, which are incomplete, missing, or not required. The analytic server 102 may remove the data records, which have missing or incomplete data fields, and thereby generate the processed data records. The analytic server 102 may store the processed data records in the system database 104.

The analytic server 102 may execute one or more evaluation rules on the processed data records associated with each artificial intelligence data model. The one or more evaluation rules may include a first evaluation rule, a second evaluation rule, a third evaluation rule, and a fourth evaluation rule. The first evaluation rule may correspond to a first protocol to determine whether training dataset within the processed data records is updated for each artificial intelligence data model. The second evaluation rule may correspond to a second protocol to determine whether any attributes associated with the processed data records have to be modified or any new attributes are to be included for each artificial intelligence data model. The third evaluation rule may correspond to a third protocol to determine whether a predicted output value associated with each artificial intelligence data model is correlated and has a similar distribution with respect to an actual output value. The fourth evaluation rule may correspond to a fourth protocol to determine whether new data coming into each artificial intelligence data model match with historical data used to build each artificial intelligence data model.

The analytic server 102 may execute the first evaluation rule on the processed data records associated with each artificial intelligence data model. For instance, the analytic server 102 may execute the first protocol on the processed data records associated with each artificial intelligence data model to determine whether the training dataset within the processed data records is updated for each artificial intelligence data model. The first protocol may be a first software program comprising a set of first instructions.

In one example, the first artificial intelligence data model may be associated with the first application. The first application is associated with the customer retention application. The first artificial intelligence data model may initially be trained with a first training dataset. The first training dataset may initially include a first set of data records. The first set of data records may include the customer incentive records, the loyalty history records, and the transaction history records. The customer incentive records, the loyalty history records, and the transaction history records may be generated from one or more first data generating systems associated with the customer retention application. The one or more first data generating systems may be modified to generate new data records. For instance, modified first data generating systems may include a new data generating system, which may result in the modified first data generating systems generating the new data records. The new data records may include the first set of data records as well as customer service records.

The analytic server 102 may execute the first protocol to query the one or more first data generating systems associated with the first application. The analytic server 102 may determine whether the one or more first data generating systems is modified, which is to determine if any new data generating system is added or any old data generating system removed. The analytic server 102 upon determining that the one or more first data generating systems are modified may compare the new data records associated with the modified first data generating systems with the first set of data records. The analytic server 102 upon determining that the data records are modified may then update the first training dataset to include the customer service records. The updated first training dataset may include the customer incentive records, the loyalty history records, the transaction history records, and the customer service records.

In another example, the second artificial intelligence data model may be associated with the second application. The second application is associated with the potential customer identification application. The second artificial intelligence data model may initially be trained with a second training dataset. The second training dataset may initially include a second set of data records. The second set of data records may include the customer inquiries records and the product marketing records. The customer inquiries records and the product marketing records may be generated from one or more second data generating systems associated with the potential customer identification application. The one or more second data generating systems may be modified to generate new data records. For instance, modified second data generating systems may remove at least one existing data generating system, which may result in the modified first data generating systems generating modified second set of data records. The modified second set of data records may only include the customer inquiries records and does not include the product marketing records.

The analytic server 102 may execute the second protocol to query the one or more second data generating systems associated with the second application. The analytic server 102 may determine whether the one or more second data generating systems are modified, which is to determine if any new data generating system is added or any old data generating system removed. The analytic server 102 upon determining that the one or more second data generating systems are modified may compare the new data records associated with the modified second data generating systems with the second set of data records. The analytic server 102 upon determining that the data records are modified may update the second training dataset to only include the customer inquiries records. The updated second training dataset may only include the customer inquiries records.

In yet another example, the third artificial intelligence data model may be associated with the third application. The third application is associated with the fraud detection application. The third artificial intelligence data model may initially be trained with a third training dataset. The third training dataset may initially include a third set of data records. The third set of data records may include the transaction location records and the background check records. The transaction location records and the background check records may be generated from one or more third data generating systems associated with the fraud detection application. The one or more third data generating systems may be modified to generate new data records. For instance, modified third data generating systems may include a new data generating system and an old data generating system is removed. This may result in the modified third data generating systems generating the new data records. The new data records may include previous background check records and new social security records.

The analytic server 102 may execute the third protocol to query the one or more third data generating systems associated with the third application. The analytic server 102 may determine whether the one or more third data generating systems are modified, which is to determine if any new data generating system is added or any old data generating system removed. The analytic server 102 upon determining that the one or more third data generating systems are modified may compare the new data records associated with modified one or more third data generating systems with the first set of data records. The analytic server 102 upon determining that the data records is modified may update the third training dataset to include the social security records and remove the transaction location records. The updated third dataset may include the background check records and the social security records.

The analytic server 102 may execute the second evaluation rule on the processed data records associated with each artificial intelligence data model. For instance, the analytic server 102 may execute the second protocol on the processed data records associated with each artificial intelligence data model to determine whether any attributes associated with the processed data records have to be modified or any new attributes are to be included for each artificial intelligence data model. The second protocol may be a second software program comprising a set of second instructions.

In one example, the first artificial intelligence data model may be associated with the first application. The first application is associated with the customer retention application. The first artificial intelligence data model may initially be trained with the first training dataset. The first training dataset may include the first set of data records. The first set of data records may include the customer incentive records, the loyalty history records, and the transaction history records. The first data model server 108 may select a first attribute associated with the customer retention application. The first attribute may correspond to age. Initially, the age may be 18-30 years. Accordingly, the customer retention application may initially be applicable for retaining the customers between 18-30 years old. The first data model server 108 may update the first attribute. The first data model server 108 may update the first attribute on receiving an input from an administrator computer. The updated first attribute may correspond to the age between 18-45 years. The customer retention application may now be applicable for retaining the customers between 18-45 years old.

The analytic server 102 may execute the second protocol to query the first data model server 108 associated with the first application. The analytic server 102 may determine if the first attribute is modified or any new attribute added. The analytic server 102 upon determining that the first attribute is modified may update the nodes of the neural network associated with the first artificial intelligence data model. When connections of the nodes are changed, a process of transmission of signals between the nodes is automatically changed, which may result in changing a logic for processing the inputs.

In another example, the second artificial intelligence data model may be associated with the second application. The second application is associated with the potential customer identification application. The second artificial intelligence data model may initially be trained with the second training dataset. The second training dataset may include the second set of data records. The second set of data records may include the customer inquiries records and the product marketing records. The second data model server 110 may select a second attribute associated with the potential customer identification application. The second attribute may correspond to age. Initially, the age may be 30-50 years. Accordingly, the potential customer identification application may initially be applicable for identifying the customers between 30-50 years old. The second data model server 110 may update the second attribute. The second data model server 110 may update the second attribute on receiving an input from an administrator computer. The updated second attribute may correspond to the age between 18-55 years. The potential customer identification application may now be applicable for identifying the customers between 18-55 years old.

The analytic server 102 may execute the second protocol to query the second data model server 110 associated with the second application. The analytic server 102 may determine if the second attribute is modified or any new attribute added. The analytic server 102 upon determining that the second attribute is modified may update the nodes of the neural network associated with the second artificial intelligence data model. When connections of the nodes are changed, a process of transmission of signals between the nodes is automatically changed, which may result in changing a logic for processing the inputs.

In yet another example, the third artificial intelligence data model may be associated with the third application. The third application is associated with the fraud detection application. The third artificial intelligence data model may initially be trained with the third training dataset. The third training dataset may include the third set of data records. The third set of data records may include the transaction location records and the background check records. The third data model server 112 may select a third attribute associated with the fraud detection application. The third attribute may correspond to health insurance forms. Accordingly, the fraud detection application may initially be applicable for customers applying for health insurance. The third data model server 112 may include a new attribute associated with vehicle insurance forms. The third data model server 112 may add the new attribute on receiving an input from an administrator computer. The fraud detection application may now be applicable for the customers applying for the health insurance as well as the vehicle insurance.

The analytic server 102 may execute the third protocol to query the third data model server 112 associated with the third application. The analytic server 102 may determine if the second attribute is modified or any new attribute added. The analytic server 102 upon determining that the new attribute is added may update the nodes of the neural network associated with the third artificial intelligence data model. When connections of the nodes are changed, a process of transmission of signals between the nodes is automatically changed, which may result in changing a logic for processing the inputs.

The analytic server 102 may execute the third evaluation rule on the processed data records associated with each artificial intelligence data model. For instance, the analytic server 102 may execute the third protocol on the processed data records associated with each artificial intelligence data model to determine whether a predicted output value associated with each artificial intelligence data model is correlated and has a similar distribution with respect to an actual output value. The third protocol may be a third software program comprising a set of third instructions.

In one example, the third artificial intelligence data model may be associated with the third application. The third application is associated with the fraud detection application. The third artificial intelligence data model may initially be trained with the third training dataset. The third training dataset may include the third set of data records. The third set of data records may include the transaction location records and the background check records.

The analytic server 102 may execute the third protocol to identify the output data records associated with the third artificial intelligence data model from the processed data records. The output data records may include a predicted number of fraud customers for last one month. The analytic server 102 may execute the third protocol to query an administrator computer. The query may include a request for actual number fraud customers for last one month. The analytic server 102 may execute the third protocol to compare the predicted number of fraud customers with the actual number fraud customers. If the predicted number of fraud customers are not correlated and do not have the similar distribution with respect to the actual number fraud customers, the analytic server 102 may update the third training dataset or the nodes of the neural network associated with the third artificial intelligence data model. When connections of the nodes is changed, a process of transmission of signals between the nodes is automatically changed, which may result in changing a logic for processing the inputs. When the logic is changed, the output may also be changed.

The analytic server 102 may execute the fourth evaluation rule on the processed data records associated with each artificial intelligence data model. The processed data records may include the new data being fed into each artificial intelligence data model. For instance, the analytic server 102 may execute the fourth protocol on the new data associated with each artificial intelligence data model to determine whether the new data match with the historical data used to build each artificial intelligence data model. The fourth protocol may be a fourth software program comprising a set of fourth instructions.

In one example, the first artificial intelligence data model may be associated with the first application. The first application is associated with the customer retention application. The first artificial intelligence data model may initially be trained with the first training dataset. The first training dataset may include the first set of data records. The first set of data records may include the customer incentive records, the loyalty history records, and the transaction history records. Upon execution of the fourth protocol, when the analytic server 102 determines that statistically the new data being fed into the first artificial intelligence data model is same as the first set of data records, the analytic server 102 may conclude that the first artificial intelligence data model is working properly. However, when the analytic server 102 may determine that the new data being fed into the first artificial intelligence data model may have significant deviation from the first set of data records, the analytic server 102 may generate an alert. The analytic server 102 may compare current outputs from the first artificial intelligence data model with previous outputs from the first artificial intelligence data model to determine whether there is any deviation in the new data with respect to the first set of data records. The analytic server 102 may transmit the alert to the analyst computer 114. The alert may include a score. The score maybe based on percentage of deviation in the new data with respect to the first set of data records. The analytic server 102 may update or rebuild the first artificial intelligence data model based on the score.

In alternate embodiments, the analytic server 102 may receive a query from a model evaluation software application. The query may include a request for a model evaluation report containing data quality analysis of certain artificial intelligence data models. The data quality analysis of the certain artificial intelligence data models may include data quality comparison of data associated with different versions of same intelligence data model based on different metrics. The metrics may include profit, accuracy, etc. The data quality analysis of the certain artificial intelligence data models may include data quality comparison of different artificial intelligence data models with respect to each other based on the different metrics. The metrics may include profit, accuracy, etc.

The analytic server 102 may parse the query. The analytic server 102 may retrieve the data records relevant to information within the query. The analytic server 102 may execute one or more evaluation rules, as discussed above, on the data records relevant to information within the query. In some cases, the analytic server 102 may execute a predetermined protocol that uses a predetermined algorithm to generate the model evaluation report, in accordance with the retrieved data records, the evaluation rules, and other factors and variables. For instance, the model evaluation report may depend on one or more variables and other relevant attributes of the artificial intelligence data models. The analytic server 102 may use one or more of the factors/attributes to generate the model evaluation report.

The analytic server 102 may use a weighted combination of the factors and variables to generate the model evaluation report. The weighted combination may be applied based on the one or more evaluation rules associated with the predetermined protocol. The model evaluation report may include performance comparison of data quality associated with certain artificial intelligence data models. The model evaluation report may include a score associated with each artificial intelligence data model. The analytic server 102 may execute a scoring algorithm to assign a score to each artificial intelligence data model. The scoring algorithm may depend on the one or more evaluation rules, and other factors and variables. The analytic server 102 may present the model evaluation report on an interactive graphical user interface 120 of the analyst computer 114.

The analytic server 102 may update one or more artificial intelligence data models, in response to the model evaluation report. For instance, when the score associated with the one or more artificial intelligence data models does not satisfy a threshold value, the analytic server 102 may update the one or more artificial intelligence data models. The analytic server 102 may update a set of training data associated with the one or more artificial intelligence data models, and train the one or more artificial intelligence data models with updated training dataset. The analytic server 102 may further update a neutral network associated with the one or more artificial intelligence data models. The updating of the neutral network associated with the one or more artificial intelligence data models may include reconfiguring arrangement of various nodes of the neutral network associated with the one or more artificial intelligence data models. The reconfiguration of the neutral network associated with the one or more artificial intelligence data models may result in modification of a framework for multiple machine learning algorithms to work together and process complex data inputs.

The analytic server 102 may continue to monitor and evaluate the data quality associated with one or more updated artificial intelligence data models. The analytic server 102 may further update the one or more updated artificial intelligence data models until a value associated with the data quality satisfies the threshold value. For instance, the analytic server 102 may further update the training dataset and/or reconfigure arrangement of various nodes of the neutral network associated with the one or more updated artificial intelligence data models.

An analyst computer 114 is a computing device comprising a processing unit. The processing unit may execute a model evaluation software application or a web browser application, which accesses or receives evaluation records associated with the artificial intelligence data models from the analytic server 102. The processing unit may include a processor with computer-readable medium, such as a random access memory (RAM) coupled to the processor. The analyst computer 114 may be running algorithms or computer executable program instructions, which may be executed by a single processor or multiple processor in a distributed configuration. The analyst computer 114 may be configured to interact with one or more software modules of a same or different type operating within the system 100.

Non-limiting examples of the processor may include a microprocessor, an application specific integrated circuit, and a field programmable object array, among others. Non-limiting examples of the analyst computer 114 may include a server computer, a workstation computer, a tablet device, and a mobile device (for example, smartphone, PDA). The analyst computer 114 is operated by an analyst of a company. The analyst may be an administrator of the company. For ease of explanation, FIG. 1 show a single computing device functioning as the analyst computer 114. However, some embodiments may include a plurality of computing devices capable of performing the tasks described herein.

The analyst computer 114 may transmit credentials from analyst inputs to a webserver 118, from which the webserver 118 may authenticate the analyst. The analyst computer 114 may include a number of input devices (for example, mouse, keyboard, touchscreen, stylus) to receive the analyst inputs, including various types of data inputs allowing for authentication, for example, username, passwords, certificates, biometrics.

The analyst computer 114 may include an interactive graphical user interface 120 (or an interactive dashboard) on which the analyst may interact by means of an input device, such as a touch screen, a mouse, a keyboard, a keypad, and others. The interactive graphical user interface 120 may collect the data records associated with the artificial intelligence data models from the analytic server 102, and display the model evaluation reports to the analyst. For example, the analyst computer 114 may provide the interactive graphical user interface 120 to the analyst to interact with the model evaluation software application hosted by a company. In some cases, the analyst computer 114 may provide the interactive graphical user interface 120 to the user to interact with a customer-centric model evaluation website hosted on the webserver 118. The analyst computer 114 may execute an Internet browser or local software application, which may access the webserver 118, in order to issue requests or instructions to the analytic server 102 to access or query the data records from the analytic server 102.

The analyst computer 114 may execute a client-side model evaluation software application, running on an operating system of the analyst computer 114, for receiving and processing the data records. The model evaluation software application may display interactive icons or buttons on the interactive graphical user interface 120. The triggering of the icons may generate a screen having a plurality of portions on the interactive graphical user interface 120. One portion of the screen may present a questionnaire associated with various questions related to various artificial intelligence data models. The analyst may select a particular artificial intelligence data model for which the analyst may need a model summary report or a model evaluation report. The analyst may submit answers to the questions related to the selected artificial intelligence data model. The analyst computer 114 may be used by the analyst to upload machine-readable computer files (for example, PDF, DOC, XSL) containing the information or the model evaluation request of the analyst. The computer files may be stored into document records in a local memory associated with the analyst computer 114.

The analyst may submit the model evaluation request and other information associated with the model evaluation request on the interactive graphical user interface 120. The analyst computer 114 may issue queries or instructions to the analytic server 102 via the webpages generated by the webserver 118, which may instruct the analytic server 102 to perform various tasks based on the model evaluation request, such as retrieving or updating the data records from the system database 104. The analytic server 102 may execute the tasks, and generate the model evaluation report using the data records. The analytic server 102 may transmit the model evaluation report to the analyst computer 114. The analyst computer 114 may present the model evaluation report on the interactive graphical user interface 120. The analyst may interact with the model evaluation report on the interactive graphical user interface 120.

A webserver 118 may be a computing device hosting a user-centric model evaluation website accessible to the analyst computer 114 via the network 116. The webserver 118 may include a processing unit and non-transitory machine-readable storage capable of executing various tasks and processes described herein. The processing unit may include a processor with computer-readable medium, such as, a random access memory coupled to the processor. Non-limiting examples of the processor may include a microprocessor, an application specific integrated circuit, and a field programmable object array, among others. Non-limiting examples of the webserver 118 may include workstation computers, laptop computers, server computers, laptop computers, and the like. While the system 100 includes a single webserver 118, in some embodiments, the webserver 118 may include a number of computing devices operating in a distributed computing environment.

The webserver 118 may be running algorithms or computer executable program instructions, which may be executed by a single processor or multiple processors in a distributed configuration. The webserver 118 may be configured to interact with one or more software modules of a same or different type operating within the system 100. For instance, the webserver 118 may execute software applications configured to host a user-centric model evaluation website (for example, Apache®, Microsoft IIS®), which may generate and serve various webpages to the analyst computer 114. The user-centric model evaluation website may be used to access the data records stored on the system database 104, analyze the data records, and generate model evaluation reports using the data records.

The webserver 118 may require analyst authentication based upon a set of analyst authorization credentials (for example, username, password, biometrics, cryptographic certificate). In such implementations, the webserver 118 may access a local memory configured to store user credentials. The webserver 118 may reference the local memory in order to determine whether a set of entered credentials purportedly authenticating the analyst match an appropriate set of credentials that identify and authenticate the analyst. Similarly, in some implementations, the webserver 118 may generate and serve webpages to the analyst computer 114 based upon information associated with the analyst and structure of a specialized graphical user interface 120 of the analyst computer 114.

In such implementations, the information associated with the analyst may be defined by data fields in analyst records stored in the local memory. The webserver 118 may conduct an authentication of the analyst by executing an access directory protocol. Upon authentication, the webserver 118 may generate webpages associated with the user-centric model evaluation website on the interactive graphical user interface 120 of the analyst computer 114, access the data records stored in the system database 104, according to the analyst specifics defined by the analyst record in the local memory.

A system database 104 is capable of storing data in a plain format and an encrypted version. The data may include records associated with a company, the records associated with the artificial intelligence data models employed by the company, and the records associated with analysts of the company. The system database 104 may be in communication with a processor of the analytic server 102 and/or the analyst computer 114. The processor is capable of executing multiple commands of the system 100. The system database 104 may be part of the analytic server 102 and/or the analyst computer 114. The system database 104 may be a separate component in communication with the analytic server 102 and/or the analyst computer 114. The system database 104 may have a logical construct of data files, which are stored in non-transitory machine-readable storage media, such as, a hard disk or memory, controlled by software modules of a database program, and a database management system that executes the code modules for various data queries and management functions.

Figure 2:
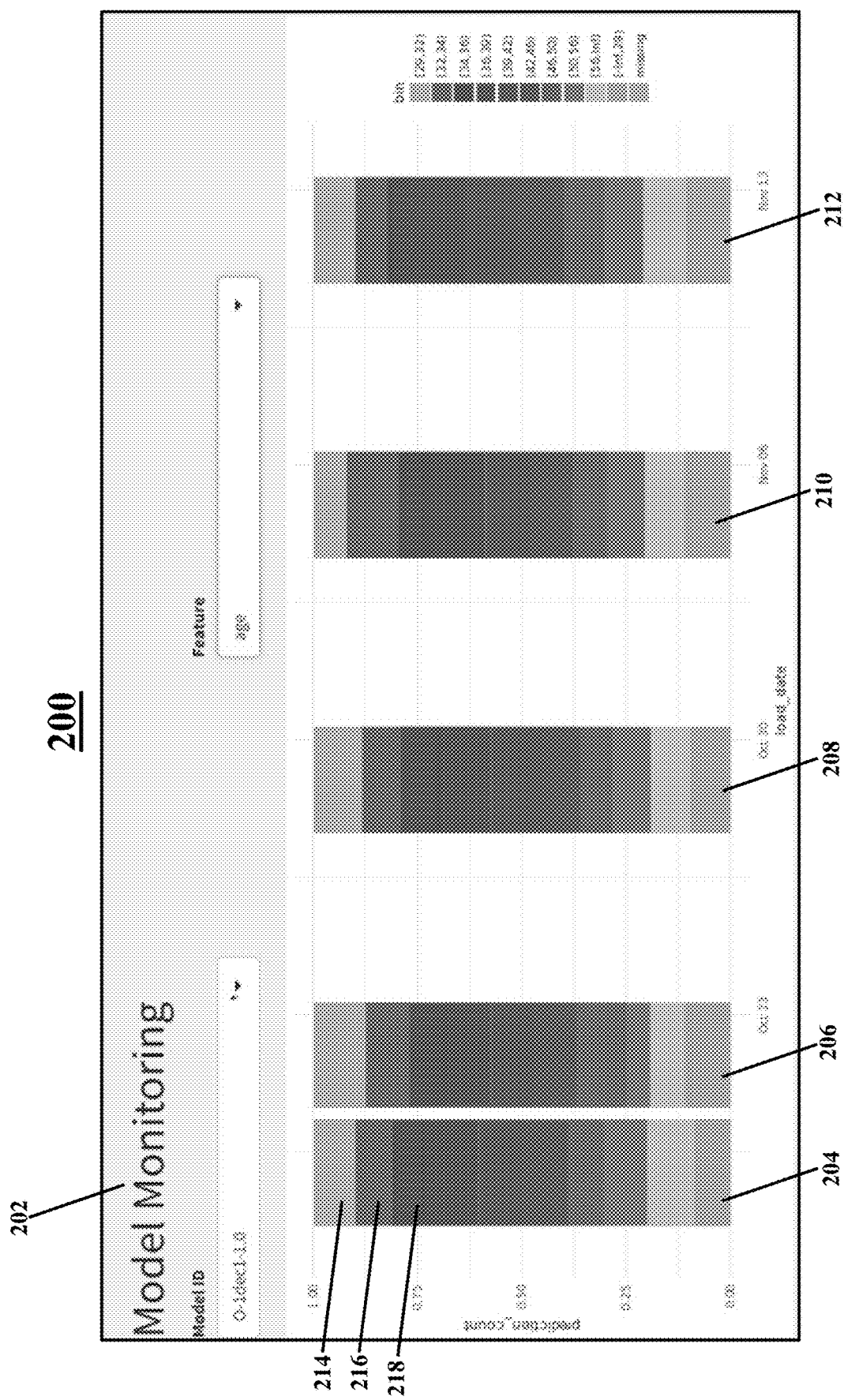
FIG. 2 shows a report displayed on an interactive dashboard, according to an embodiment.

FIG. 2 shows a report 202 displayed on an interactive dashboard 200 of an analyst computer operated by an analyst. The analyst computer may be a portable or a non-portable device, such as, a desktop computer, a laptop computer, a tablet computer, a smart phone, a smart watch, a personal digital assistant, or the like. The analyst computer may include a processor, which may perform one or more operations according to one or more programming instructions. The analyst computer is capable of communicating with an analytic server through a communications network using wired or wireless communication capabilities.

A model evaluation software application may be installed on the analyst computer or displayed on a user-centric website of a company. The model evaluation software application may be operated on the analyst computer. For example, the company may generate the model evaluation software application as a widget to communicate with different type of analysts, and the widget may be displayed on a website of the company visible to all the analysts. The analyst may use the model evaluation software application to evaluate data quality associated with multiple artificial intelligence data models.

The analyst computer may have access to pre-stored web-based interfaces, such as, webpages, comprising a number of preconfigured sub-interfaces, or containers, that are dynamically populated (for example, widget box). For example, the model evaluation software application webpages may contain code, such as HTML, presenting a website of a number of webpages having a unique look-and-feel. One or more outputs may display webpages, which may contain additional code for containers, where the container code may display the model evaluation software application widget.

The analyst may access a webpage of the model evaluation software application to generate requests, and receive the analysis reports 202, in response to the request. The analyst may interact with various analysis reports 202 displayed on the interactive dashboard 200. In some implementations, the analyst computer may require analyst authentication based upon a set of user authorization credentials to provide access to the model evaluation software application on the analyst computer. For example, the analyst computer may access a local memory configured to store the analyst credentials, which a webserver may reference in order to determine whether a set of entered credentials purportedly authenticating the analyst match an appropriate set of credentials that identify and authenticate the analyst. Similarly, in some implementations, the webserver may generate and serve the webpages associated with the model evaluation software application to the analyst computer, based upon an analyst profile account. The webserver may generate and serve the webpages associated with the model evaluation software application to the analyst computer, based upon the analyst membership. The analyst profile may be defined by data fields in analyst records stored in the local memory, and the webserver may conduct the authentication of the analyst and the analyst profile.

The analyst may access the model evaluation software application by a common access method, for example, keying in a URL, selecting from search results, etc., and submit analyst credentials to access the model evaluation software application. Upon the webserver authenticating the analyst using credentials that identify the analyst as a valid member of the company, the analyst is presented the model evaluation software application on the interactive dashboard 200. A page of the model evaluation software application may display selectable graphical components representing the reports 202. For example, a first selectable graphical component may be associated with the report 202.

The selectable graphical component is displayed on a top portion of the interactive dashboard 200. The analyst may interact with the selectable graphical component using an input device such as a pointer of the analyst computer. When the analyst interacts with the selectable graphical component, sub-interfaces are displayed in a bottom portion of the interactive dashboard 200. The sub-interfaces may display various charts (for example, stacked bar charts) showing the report 202 of an output of an artificial intelligence data model. The artificial intelligence data model may be trained using training data.

A first column 204 displayed on the sub-interfaces may be a baseline information column. The first column 204 may include multiple shaded bins (for example, 10 bins) placed on top of each other. Each bin may represent an age group of customers, which applied for a product (for example, a life insurance policy) during a predetermined period of time (for example, 3 years). Initially, the training data is collected of all the customers who applied for the product. Then, the customers are sorted by their age. Then, all the customers are divided into 10 equal bins based on their age. For instance, a first bin 214 may represent 10 percent of customers between age 29 and 32, a second bin 216 may represent 10 percent of customers between age 32 and 34, a third bin 218 may represent 10 percent of customers between age 34 and 36, and so on.

A second column 206 displayed on the sub-interfaces may be an output information column showing the output information for one week (for example, the week of October $23^{rd}$) associated with the artificial intelligence data model. The second column 206 may include multiple shaded bins (for example, 10 bins) placed on top of each other. Each bin may represent an age group of customers, which applied for a product (for example, a life insurance policy) during a predetermined period of time (for example, one week). The output information in each bin of the second column 206 may be compared to the baseline information in each bin of the first column 204 to determine percentage increase or decrease in the number of customers for a particular age group. For instance, the comparison may indicate that in the week of October $23^{rd}$, there was a decrease in customers between 50 and 56, and an increase in the customers between 46 and 50.

A third column 208 displayed on the sub-interfaces may be an output information column showing the output information for the one week (for example, the week of October $30^{th}$) associated with the artificial intelligence data model. The third column 208 may include multiple shaded bins (for example, 10 bins) placed on top of each other. Each bin may represent an age group of customers, which applied for a product (for example, a life insurance policy) during a predetermined period of time (for example, one week). The output information in each bin of the third column 208 may be compared to the baseline information in each bin of the first column 204 to determine percentage increase or decrease in the number of customers for a particular age group.

A fourth column 210 displayed on the sub-interfaces may be an output information column showing the output information for one week (for example, the week of November $6^{th}$) associated with the artificial intelligence data model. The fourth column 210 may include multiple shaded bins (for example, 10 bins) placed on top of each other. Each bin may represent an age group of customers, which applied for a product (for example, a life insurance policy) during a predetermined period of time (for example, one week). The output information in each bin of the fourth column 210 may be compared to the baseline information in each bin of the first column 204 to determine percentage increase or decrease in the number of customers for a particular age group.

A fifth column 212 displayed on the sub-interfaces may be an output information column showing the output information for one week (for example, the week of November $13^{th}$) associated with the artificial intelligence data model. The fifth column 212 may include multiple shaded bins (for example, 10 bins) placed on top of each other. Each bin may represent an age group of customers, which applied for a product (for example, a life insurance policy) during a predetermined period of time (for example, one week). The output information in each bin of the fifth column 212 may be compared to the baseline information in each bin of the first column 204 to determine percentage increase or decrease in the number of customers for a particular age group.

The analyst may review all information presented on the first column 204, the second column 206, the third column 208, the fourth column 210, and the fifth column 212. Based on the review, the analyst may evaluate data quality associated with the artificial intelligence data model. The analyst may generate and transmit instructions from the analyst computer to an analytic server to update the artificial intelligence data model. The analytic server may update the training dataset of the artificial intelligence data model and/or reconfigure arrangement of various nodes of the neutral network associated with the artificial intelligence data model.

Figure 3A:
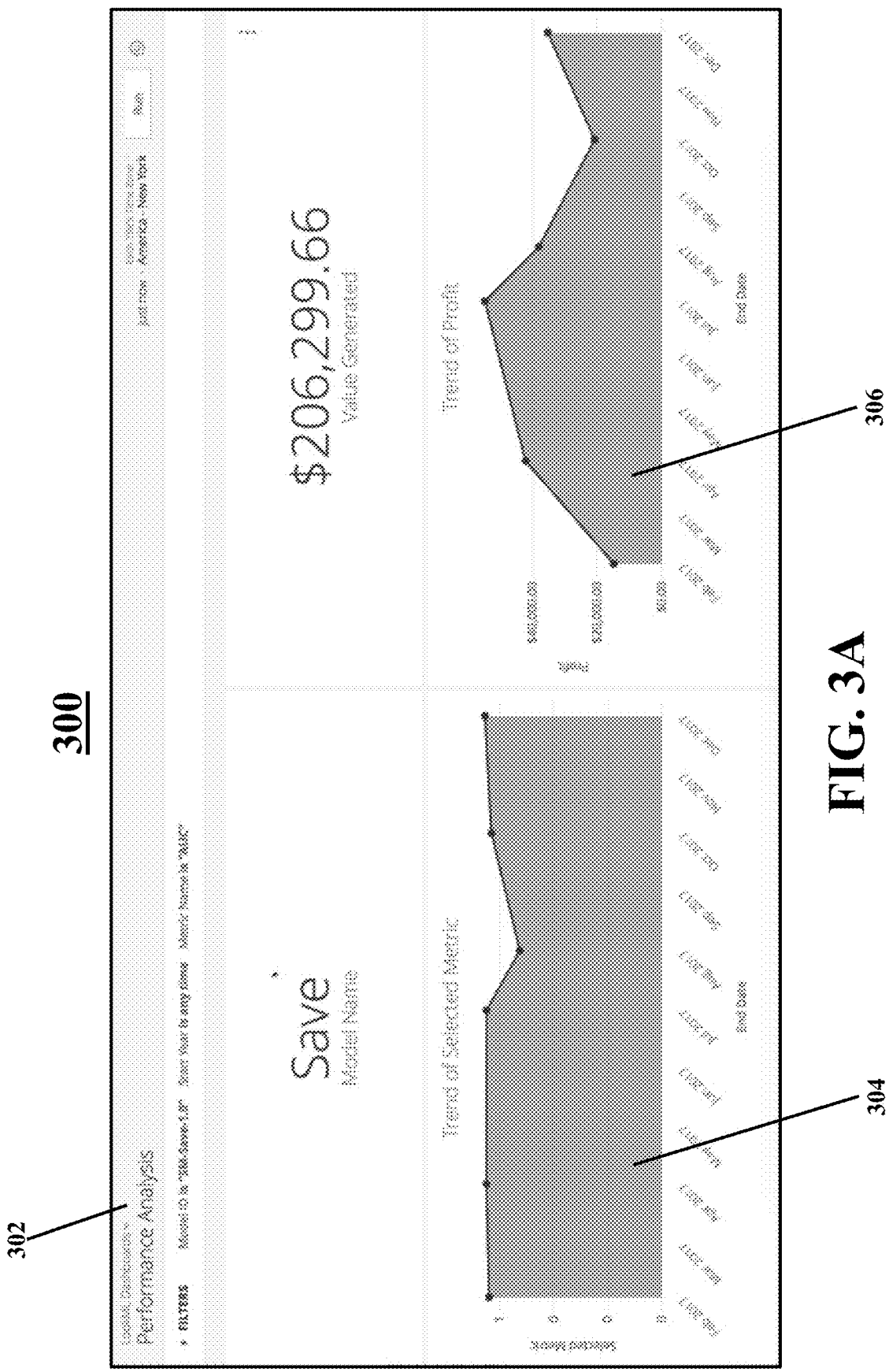
FIG. 3A shows a first report displayed on an interactive dashboard, according to an embodiment.
Figure 3B:
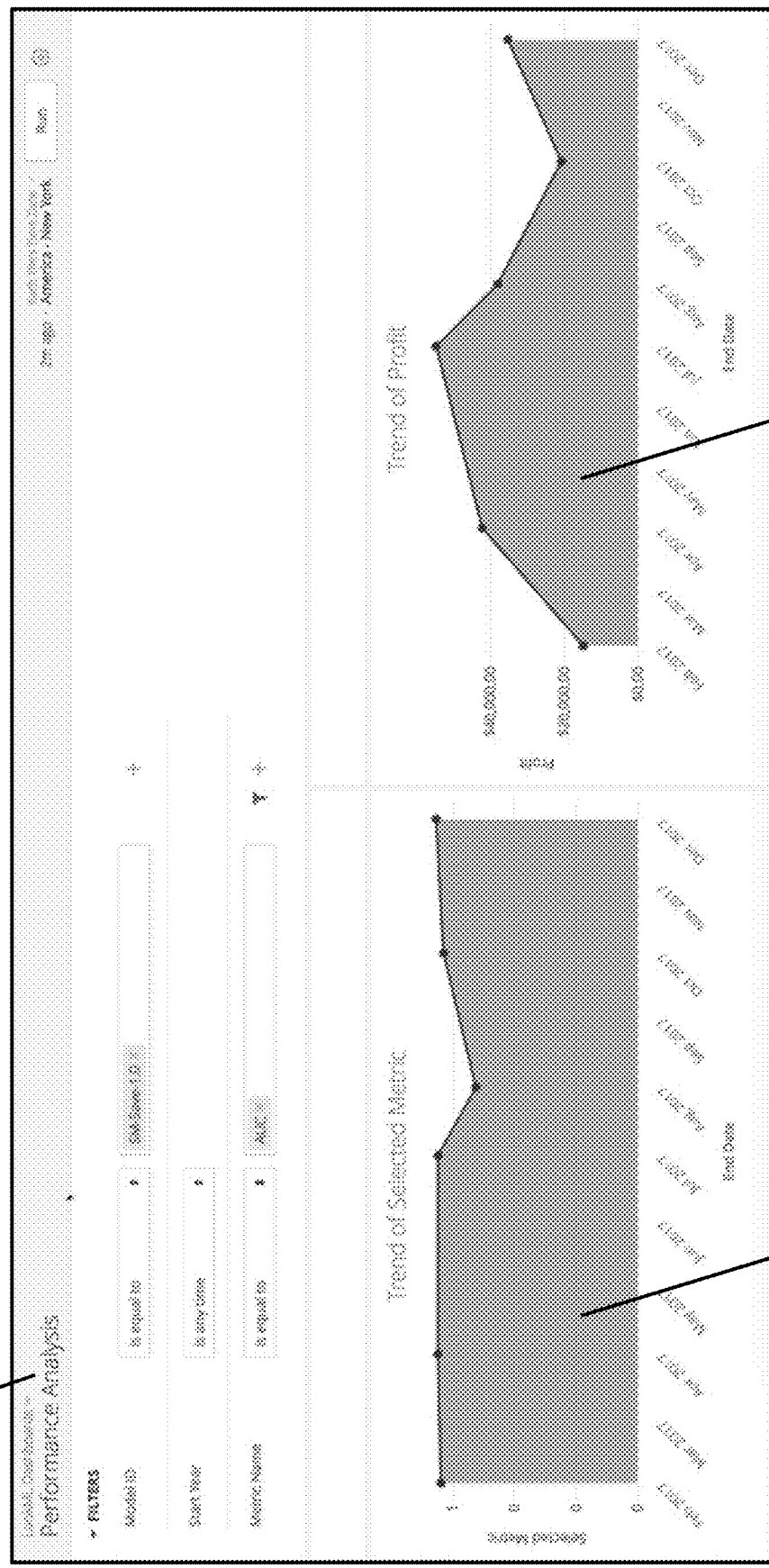
FIG. 3B shows a first report displayed on an interactive dashboard, according to an embodiment.

FIGS. 3A, 3B, and 3C show a first report 302 displayed on an interactive dashboard 300 of an analyst computer operated by an analyst. The analyst may access a model evaluation software application on the analyst computer by a common access method, for example, keying in a URL, selecting from search results, etc., and submit analyst credentials to access the model evaluation software application. Upon a webserver authenticating the analyst using credentials that identify the analyst as a valid member of a company, the analyst is presented the model evaluation software application on the interactive dashboard 300. A page of the model evaluation software application may display selectable graphical components representing the first reports 302.

The selectable graphical component is displayed on a top portion of the interactive dashboard 300. The analyst may interact with the selectable graphical component using an input device such as a pointer of the analyst computer. When the analyst interacts with the selectable graphical component, sub-interfaces are displayed in a bottom portion of the interactive dashboard 300. The sub-interfaces may display various charts showing the first report 302 of an output of an artificial intelligence data model. The artificial intelligence data model may be trained using training data.

The charts may include a first chart 304 and a second chart 306. The first chart 304 may display a trend of a selected metric associated with the artificial intelligence data model over a period of time. The second chart 306 may display a trend of profit over a period of time. The profit may be determined based on the output of the artificial intelligence data model.

The analyst may review all information presented on the first chart 304 and the second chart 306. Based on the review, the analyst may evaluate data quality associated with a particular version of the artificial intelligence data model. For example, when the profit is below predetermined threshold value, the analyst may generate and transmit instructions from the analyst computer to an analytic server to update the particular version of the artificial intelligence data model. The analytic server may update the training dataset of the artificial intelligence data model and/or reconfigure arrangement of various nodes of the neutral network associated with the artificial intelligence data model.

Figure 3D:
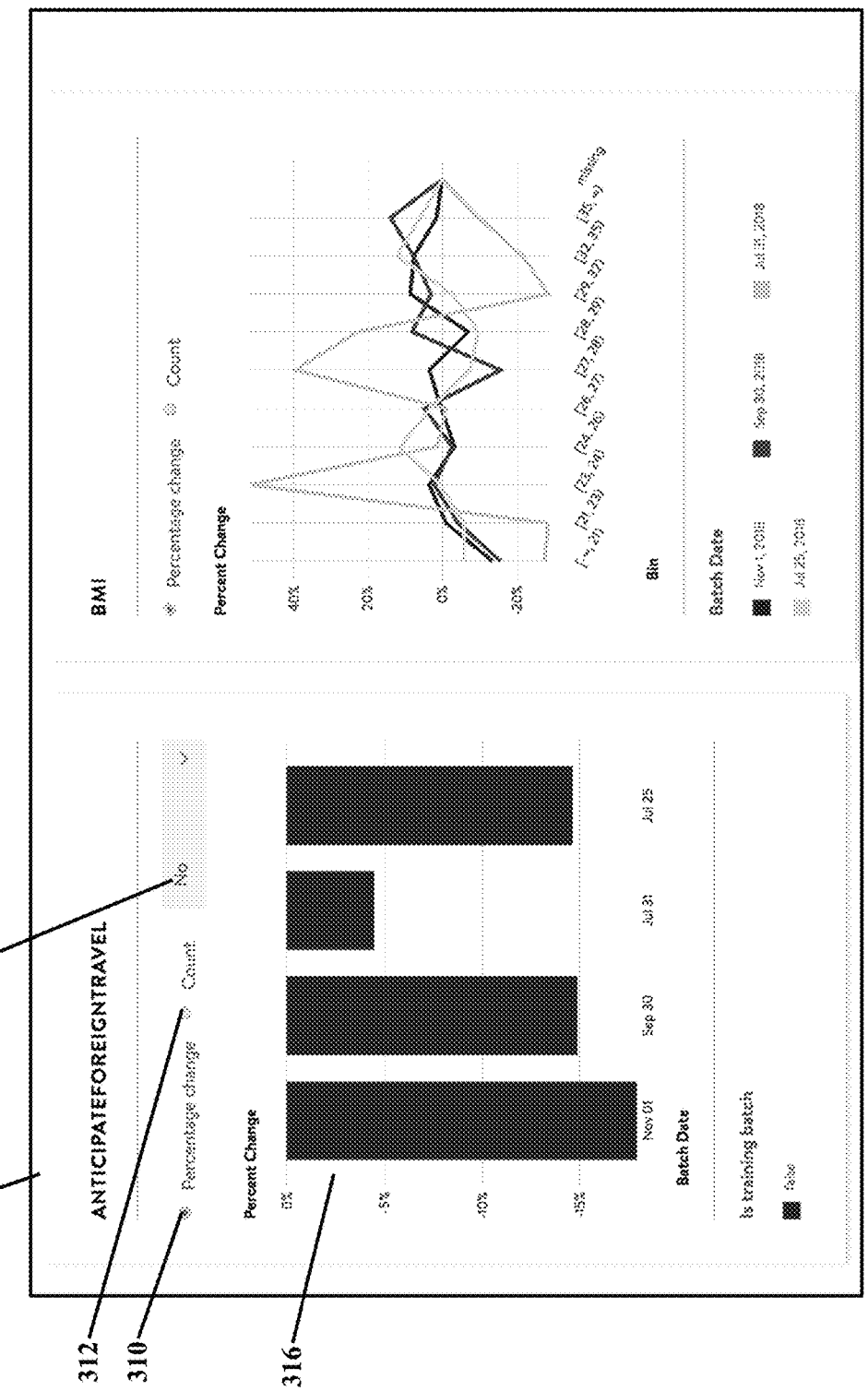
FIG. 3D shows a second report displayed on an interactive dashboard, according to an embodiment.
Figure 3E:
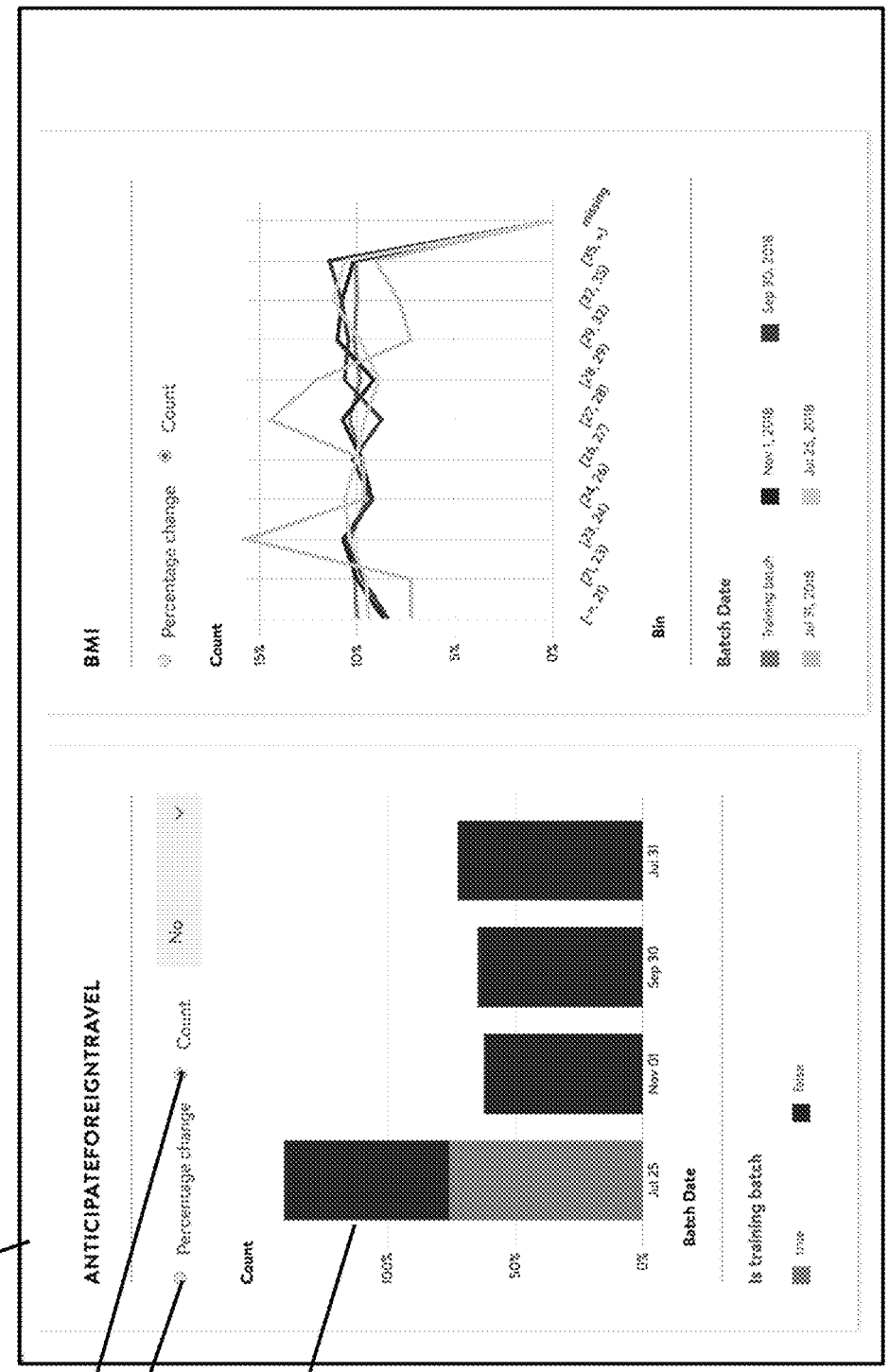
FIG. 3E shows a second report displayed on an interactive dashboard, according to an embodiment.
Figure 3F:
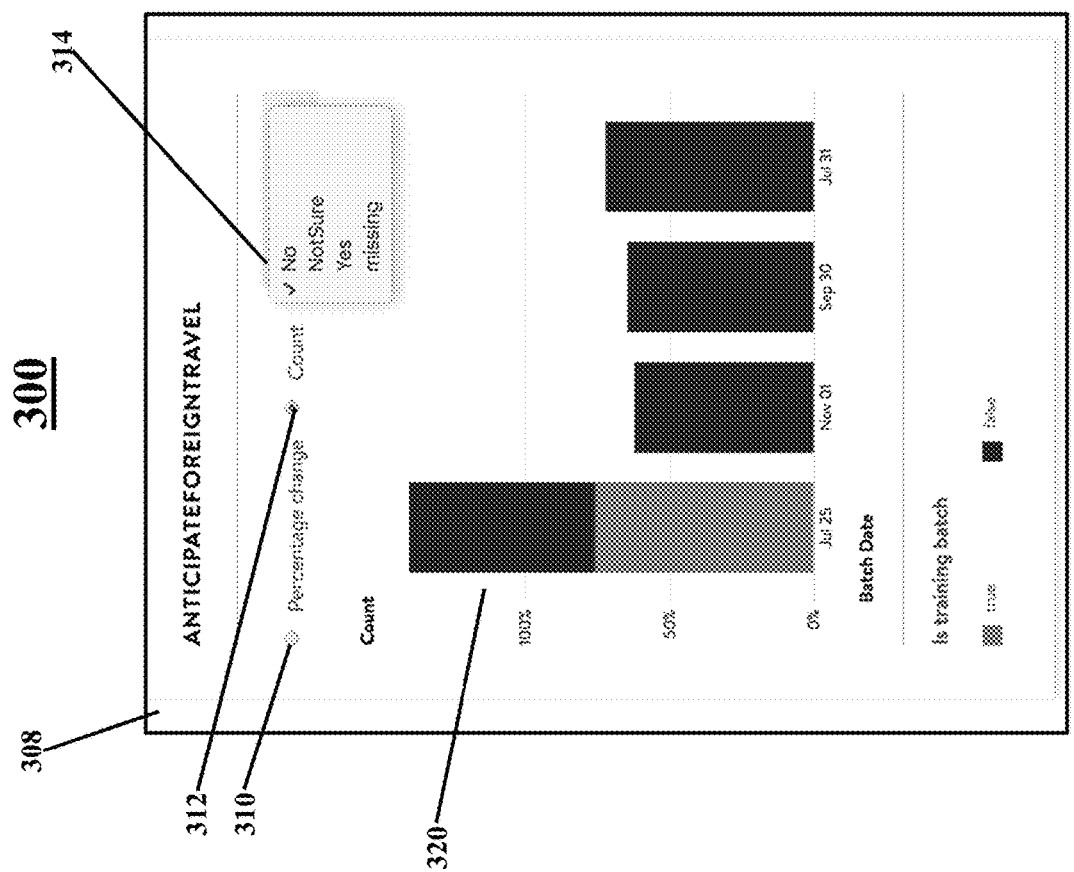
FIG. 3F shows a second report displayed on an interactive dashboard, according to an embodiment.

FIGS. 3D, 3E, and 3F show a second report 308 displayed on an interactive dashboard 300 of an analyst computer operated by an analyst. A page of the model evaluation software application may display selectable graphical components representing the second report 308. The selectable graphical components may include a first selectable graphical component 310, a second selectable graphical component 312, and a third selectable graphical component 314. The first selectable graphical component 310 may be a percentage change button. The second selectable graphical component 312 may be a count button.

A top portion of the interactive dashboard 300 displays the first selectable graphical component 310, the second selectable graphical component 312, and the third selectable graphical component 314. The analyst may interact with the first selectable graphical component 310, the second selectable graphical component 312, and the third selectable graphical component 314 using an input device such as a pointer of the analyst computer. When the analyst interacts with the first selectable graphical component 310, the second selectable graphical component 312, or the third selectable graphical component 314, sub-interfaces are displayed in a bottom portion of the interactive dashboard 300. The sub-interfaces may display various charts showing the second report 308.

When the analyst interacts with the first selectable graphical component 310, sub-interfaces associated with a first set of charts 316 are displayed on the interactive dashboard 300. The first set of charts 316 represent a percentage of real scored data of an artificial intelligence data model that differs from historical training data of the artificial intelligence data model over a period of time.

When the analyst interacts with the second selectable graphical component 312, sub-interfaces associated with a second set of charts 318 are displayed on the interactive dashboard 300. The second set of charts 318 represent raw data counts as percentage of total population of each bin. The second set of charts 318 also represent training data counts, which enable the analyst to view drifts associated with the raw data counts and the training data counts.

When the analyst interacts with the third selectable graphical component 314 to select a particular category, sub-interfaces associated with a third set of charts 320 are displayed on the interactive dashboard 300. The third set of charts 320 represent how a population for a specific selected category has shifted over a period of time.

FIG. 4 shows execution steps of real time monitoring of data quality associated with various versions of multiple artificial intelligence data models, according to a method 400. The method 400 shown in FIG. 4 may include execution steps 402, 404, 406, 408, 410, 412, 414, and 416. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 400 of the FIG. 4 is described as being executed by a server computer in this embodiment. The server computer executing one or more steps may be programmed to execute various other, unrelated essential features. The steps may also be executed by a plurality of server computing devices operating in a distributed computing environment. One or more steps of the method 400 may be performed by a server, such as the analytic server described in FIG. 1 (referred herein as the server computer).

In a first step 402, a server computer may receive information associated with multiple artificial intelligence data models. The information may include configuration information associated with each artificial intelligence data model. The configuration information may include a set of rules associated with each artificial intelligence data model. The set of rules may be defined from information associated with one or more attributes of training data for each artificial intelligence data model. The configuration information may further include a version number associated with each artificial intelligence data model.

Each artificial intelligence data model may support a particular business application, such as, a customer retention application, a potential customer identification application, and a fraud detection application. Each artificial intelligence data model may be a fuzzy logic model or a linear system model. Each artificial intelligence data model may be a neural network based model. The neural network may include multiple network nodes. The multiple network nodes may be arranged in a particular arrangement or configuration. Each network node may correspond to one or more attributes associated with training data for corresponding artificial intelligence data model.

The server computer may train each artificial intelligence data model using training datasets. The training datasets may include a set of input parameters and a set of output parameters. The server computer may pre-process the training datasets to clean up data records within the training datasets for obvious errors and to eliminate redundancies prior to training each artificial intelligence data model. The server computer may then train each artificial intelligence data model using corresponding pre-processed training datasets. The pre-processed training datasets may include inputs parameters and output parameters. The input parameters may be images of insurance application forms. The output parameters may be correct vehicle numbers within the images. For example, the server computer may train an artificial intelligence data model to identify vehicle numbers within the images of insurance application forms, determine if the vehicles numbers are correct, and then correct the vehicle numbers if the vehicle numbers are not correct.

The server computer may evaluate each artificial intelligence data model, by a predetermined criteria, to determine whether the training is completed. The predetermined criteria may include desired ranges of accuracy, time, or number of training iterations. When the training of each artificial intelligence data model is completed after the predetermined number of training iterations, the server computer may run test cases on each artificial intelligence data model. The test cases may be performed based on the predetermined criteria. The server computer may continue to correct each artificial intelligence data model until the desired ranges of accuracy and time is achieved. To correct the artificial intelligence data models, the server computer may either change the training dataset or modify the neural network or both.

The server computer may validate each artificial intelligence data model when each artificial intelligence data model is sufficiently trained to produce correct outcome. Upon validation, each artificial intelligence data model is operated to produce the plurality of outputs when provided with the plurality of inputs.

In a next step 404, a server computer may receive inputs associated with each artificial intelligence data model over a predetermined period of time. The server computer may receive the inputs from data model servers associated with the artificial intelligence data models. The server computer may receive the inputs from databases associated with the data model servers. The inputs may include a set of images of various insurance application forms.

In a next step 406, a server computer may receive outputs generated by each artificial intelligence data model corresponding to the inputs over the predetermined period of time. The server computer may receive the outputs from the data model servers associated with the artificial intelligence data models. The server computer may receive the outputs from the databases associated with the data model servers. The outputs may include a set of correct vehicle numbers based on the set of images.

In a next step 408, a server computer may generate reports. The reports may correspond to model evaluation reports. The reports may include comparison of data quality associated with different versions of same artificial intelligence data model based on different metrics. The metrics may include profit, accuracy, area under the curve (AUC), etc. The reports may include comparison of data quality associated with different artificial intelligence data models with respect to each other based on the different metrics. The metrics may include profit, accuracy, etc.

A first report associated with one version of a first artificial intelligence data model may include an accuracy of output generated by the first artificial intelligence data model over a period of time. The server computer may compare the output generated by the first artificial intelligence data model (for example, predictive output) with actual output to determine the accuracy.

A second report associated with one version of a second artificial intelligence data model may include an accuracy of output generated by the second artificial intelligence data model over a period of time. The server computer may compare the output generated by the second artificial intelligence data model (for example, predictive output) with actual output to determine the accuracy.

In a next step 410, a server computer may display the first report and the second report on a dashboard interface of an analyst computer. The analyst computer may interact with selectable graphical components on the dashboard interface to select the first report, the second report, or both for viewing on the dashboard interface. The analyst computer may generate and submit instructions on the dashboard interface to modify the first report, the second report, or both. The analyst computer may generate and submit instructions on the dashboard interface to store a local copy of the first report, the second report, or both in a memory of the analyst computer.

In a next step 412, in response to receiving an instruction from the analyst computer, a server computer may select the first report. The server computer may apply an evaluation rule on the first report to determine whether the evaluation rule is satisfied. The evaluation rule may correspond to a protocol to determine relationship between predicted output associated with each artificial intelligence data model and an actual output.

The server computer may execute the protocol to determine the difference between the predictive output and the actual output. Then, the server computer may determine whether the difference between the predictive output and the actual output satisfy a predetermined threshold value. If the difference between the predictive output and the actual output satisfy the predetermined threshold value, the evaluation rule is satisfied. If the difference between the predictive output and the actual output does not satisfy the predetermined threshold value, the evaluation rule is not satisfied. Similarly, the server computer may be able to select the second report, and apply corresponding evaluation rule to determine whether the evaluation rule is satisfied.

In a next step 414, upon determining that the evaluation rule is not satisfied, a server computer may generate one or more action items associated with the corresponding first artificial intelligence data model. The action items may include updating the training dataset associated with the first artificial intelligence data model. The action items may include reconfiguring the neural network associated with the first artificial intelligence data model, in accordance with a machine learning algorithm.

In a next step 416, a server computer may execute the action items to update the training dataset associated with the corresponding first artificial intelligence data model and/or reconfigure the neural network associated with the corresponding first artificial intelligence data model.

The server computer may re-train the first artificial intelligence data model with updated training dataset. The server computer may evaluate the first artificial intelligence data model, by a predetermined criteria, to determine whether the re-training is completed. The predetermined criteria may include desired ranges of accuracy, time, or a number of re-training iterations. When re-training of the first artificial intelligence data model is completed after the predetermined number of re-training iterations, the server computer may run test cases on the first artificial intelligence data model. The server computer may validate the first artificial intelligence data model when the first artificial intelligence data model is sufficiently re-trained to produce correct outcome. Upon validation, the first artificial intelligence data model is operated to produce the plurality of outputs when provided with the plurality of inputs.

FIG. 5 shows execution steps of real time monitoring of data quality associated with various versions of multiple artificial intelligence data models, according to a method 500. The method 500 shown in FIG. 5 may include execution steps 502, 504, 506, 508, 510, and 512. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 500 of the FIG. 5 is described as being executed by a server computer in this embodiment. The server computer executing one or more steps may be programmed to execute various other, unrelated essential features. The steps may also be executed by a plurality of server computing devices operating in a distributed computing environment. One or more steps of the method 500 may be performed by a server, such as the analytic server described in FIG. 1 (referred herein as the server computer).

In a first step 502, a server computer may receive information associated with multiple artificial intelligence data models. The information may include configuration information associated with each artificial intelligence data model. The configuration information may include a set of rules associated with each artificial intelligence data model. The set of rules may be defined from information associated with one or more attributes of training data for each artificial intelligence data model. The configuration information may further include a version number associated with each artificial intelligence data model.

Each artificial intelligence data model may support a particular business application, such as, a customer retention application, a potential customer identification application, and a fraud detection application. Each artificial intelligence data model may be a fuzzy logic model or a linear system model. Each artificial intelligence data model may be a neural network based model. The neural network may include multiple network nodes. The multiple network nodes may be arranged in a particular arrangement or configuration. Each network node may correspond to one or more attributes associated with training data for corresponding artificial intelligence data model.

The server computer may train each artificial intelligence data model using training datasets. The training datasets may include a set of input parameters and a set of output parameters. The server computer may pre-process the training datasets to clean up data records within the training datasets for obvious errors and to eliminate redundancies prior to training each artificial intelligence data model. The server computer may then train each artificial intelligence data model using corresponding pre-processed training datasets. The pre-processed training datasets may include inputs parameters and output parameters.

In a next step 504, a server computer may receive inputs associated with each artificial intelligence data model over a predetermined period of time. The server computer may receive the inputs from data model servers associated with the artificial intelligence data models. The server computer may receive the inputs from databases associated with the data model servers.

In a next step 506, a server computer may receive outputs generated by each artificial intelligence data model corresponding to the inputs over the predetermined period of time. The server computer may receive the outputs from the data model servers associated with the artificial intelligence data models. The server computer may receive the outputs from the databases associated with the data model servers.

In a next step 508, a server computer may display an interactive graphical user interface on an analyst computer. The interactive graphical user interface may correspond to an interactive dashboard.

In a next step 510, a server computer may display a first graphical indicator on the interactive dashboard. The first graphical indicator may represent configuration and version information associated with each artificial intelligence data model. An analyst may be able to generate and transmit instructions on the interactive dashboard to select an artificial intelligence data model of any configuration/version. For example, the analyst may be able to generate and transmit instructions on the interactive dashboard to select a first version of a first artificial intelligence data model.

In a next step 512, a server computer may display a second graphical indicator on the interactive dashboard. The second graphical indicator may represent a metric generated based on the inputs and the outputs. The metric may include an accuracy report based on comparison of a predictive output and an actual output. The predictive output may be determined using the inputs and the outputs. The metric may be displayed in form of one or more graphs. The server computer may continuously update a graph associated with the metric by continuously receiving and using a latest input and output from each artificial intelligence data model.

Additionally or alternatively, the analytic server (sometimes referred to herein as the computer server) may also identify and/or visualize anomalies. Anomalies, as used herein, may refer to identifying data instances (e.g., results of execution of one or more models and/or customer attributes causing one or more models to generate results) that are unusual and do not fit within a predetermine tolerance or established pattern. Identifying anomalies allows the analytic server to notify system administrators that one or more model may need to be revised.

Figure 6:
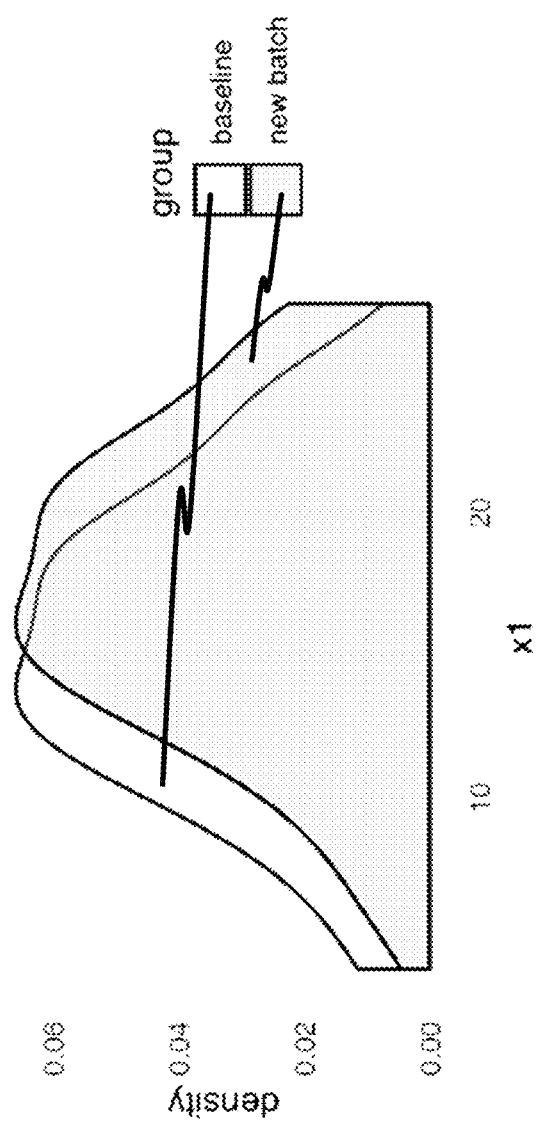
FIGS. 6-7 visually illustrate anomalies in model data, according to an embodiment.
Figure 7:
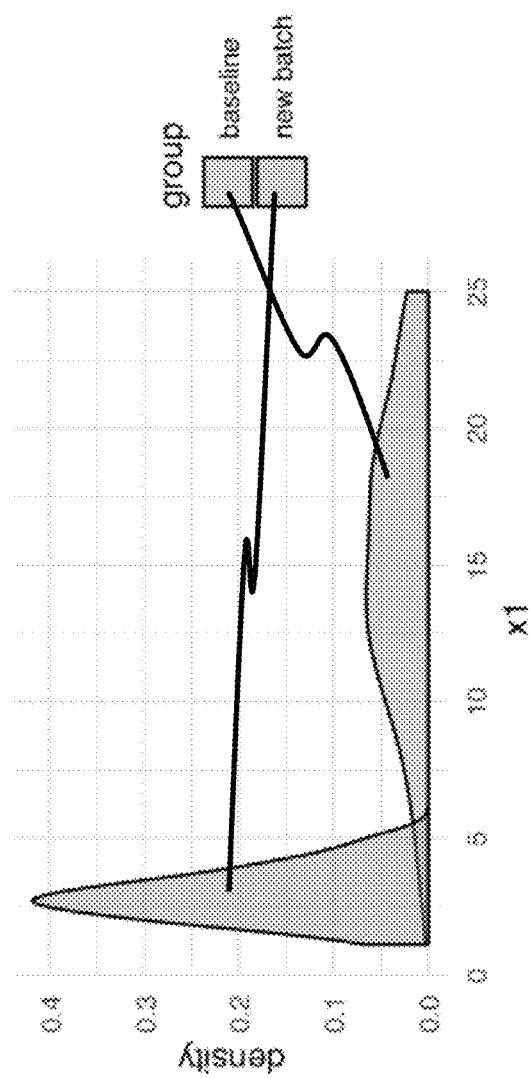

The methods and systems described herein provide continuous monitoring of the inputs and outputs of various computer models. Distributional drift or sudden outliers in incoming data can manifest in enterprise systems, affecting the quality of outputs and downstream decisions. Small, consistent shifts relative to the baseline distribution could indicate the population that the model is acting upon is different from expected, leading to unexpected behavior of the larger business process that the model is embedded in. For instance, as depicted in FIG. 6, new batch of data (new inputs received or new outputs generated) may differ from baseline values. Similarly, as depicted in FIG. 7, major differences in incoming data (e.g., data ingested or to be ingested by one or more models) could signify errors either in the new batch or the data that the model was trained against.

In the model monitoring system described herein, each variable being monitored assumes one of two possible data types, "categorical" or "continuous." Categorical variables contain a finite number of categories or distinct groups. Categorical data might not have a logical order. In contrast, continuous variables are numeric variables that have an infinite number of values between any two values. A continuous variable can be numeric or date/time.

For categorical data, the analytic server may use a Chi-square test to compare two categorical distributions of data batches (e.g., ingested data segmented based on different timeframes). The analytic server may use the Kolmogorov-Smirnov (KS) test for comparing two continuous distributions, which measures the maximum difference between the two empirical cumulative distribution function curves.

The analytic server may first map all inputs and outputs (generated as a result of execution of one or more models) and analyze the mapped value to identify anomalies. The analytic server may use any clustering method/algorithm to assign the inputs and outputs to discrete bins.

The analytic server may use the following empirical distribution function $F_n$ for $n_{iid}$ ordered observations:

$$F_n(x) = \frac{1}{n}\sum_{i=1}^{n} I[-\infty, x](X_i)$$

where $I_{[-i,x]}(X_i)$ is the indicator function, equal to 1 if $X_i \leq x$ and equal to 0 otherwise. The Kolomogorov-Smirnov test statistic for a given cumulative distribution function $F(x)$ may be used as:

$$D_n = \sup_x |F_n(x) - F(x)|$$

where $\sup_x$ is the supremum of the set of distances between the two functions.

The analytic server may also conduct a chi-squared hypothesis test to identify anomalies. The analytic server may use the values generated as a result of the above-described testing to determine anomalies. If the generated value is less than or equal to 0.05 (or any other predetermined value) then the feature is flagged as anomalous. To address the sensitivity of the chi-squared p-value to large batch sizes (common for batch models), a scaling factor may be applied to the new batch.

Non-Limiting Example

Figure 8:
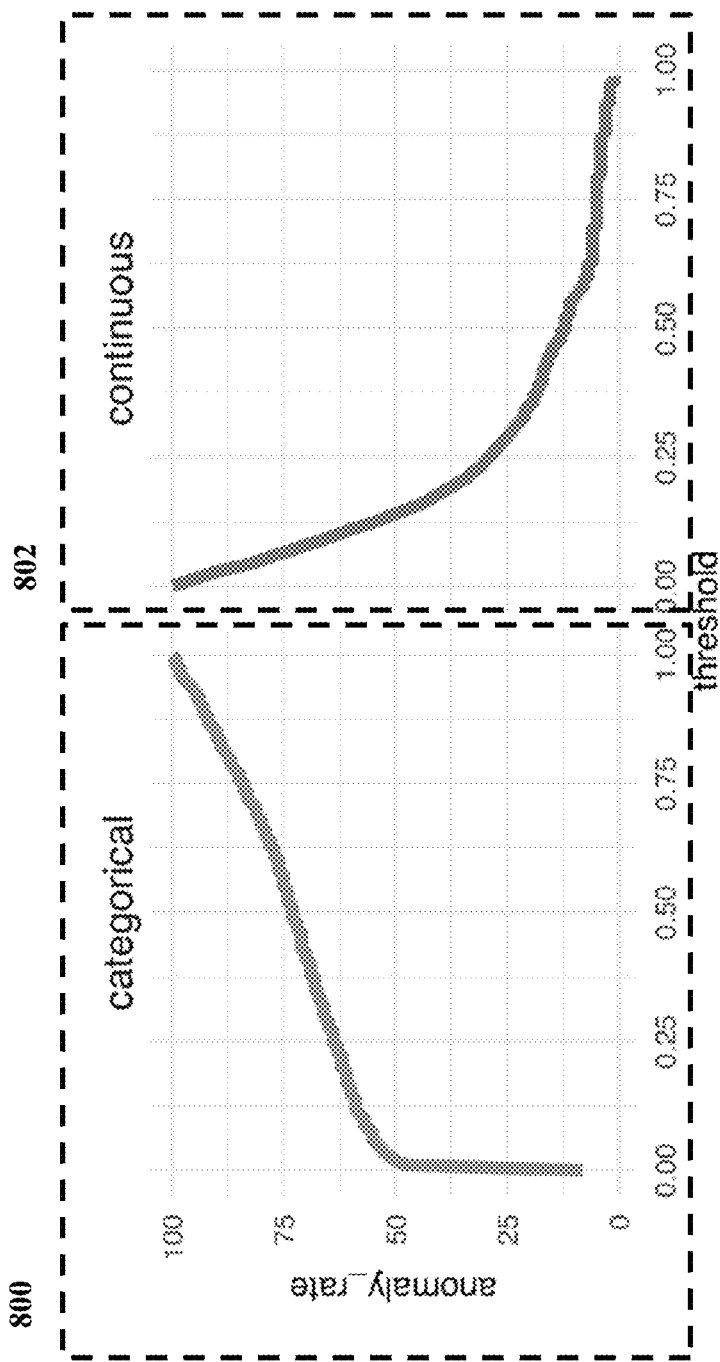
FIGS. 8-10 are graphical user interfaces displayed for real time monitoring of data associated with various versions of multiple artificial intelligence data models, according to an embodiment.

The analytic server monitors inputs/outputs of various models where batch is specific to a product, date, and variable. A few products have at least one "new batch" to score. Applying initial scores and experimenting with thresholds provides insight about both the quality of the scores and the quality of the baseline distributions. FIG. 8 illustrates a plot indicating the anomaly rate at 100 different thresholds, note there are two thresholds required: one for each of the feature types. For instance, graph 800 depicts a graph having the thresholds displayed on the X-axis and a number of anomalies (anomaly rate) on the Y-axis for categorical data types. Similarity, graph 802 depicts the number of anomalies found and their corresponding thresholds. As depicted, chi-square p-value varies with the anomaly rate similar to a logistic distribution while the K.S. test score has varies smoothly with the anomaly rate.

Scoring all the batches may uncover a number of observations. For instance, some bins may only contain a single value. Therefore, these attributes should likely be excluded from calculations. Some batches may contain no data at all. Therefore, the analytic server may assign a score of zero and perform the calculations. In some configurations, the anomaly score may be calculated as zero. This may be for any of the following reasons: 1) the new batch may have only one bin; the sum of number of observations over all new batch bins may be zero; and/or the number of observations for some baseline categorical feature bin may be zero.

Given a set of product ID configuration files (e.g., various models being executed to identify attributes of a product, such as executing an artificial intelligence model to determine price points for a potential customer), the analytic server may analyze baseline feature batches (sometimes referred to as "training" batches) and new feature batches (sometimes referred to as "non-baseline"/"non-training" batches) related to various computer models described herein. The analytic server may calculate a scalar "anomaly score" for each baseline-new batch pair. For each product ID (or model), if any baseline-new batch pair has an anomaly score that satisfies a threshold, the analytic server may generate/transmit an email report to recipients defined in the configuration file corresponding to that product ID (e.g., data scientists or administrator in charge of one or more computer models associated with the product ID).

As a result of the above-described calculations, the analytic server may compare baseline batches and new batches to identify whether anomalies exist. If anomalies exist, then the system administrator may consider revising the baseline data. For instance, the system administrator can define the baseline as results generated within a specific time period.

Figure 9:
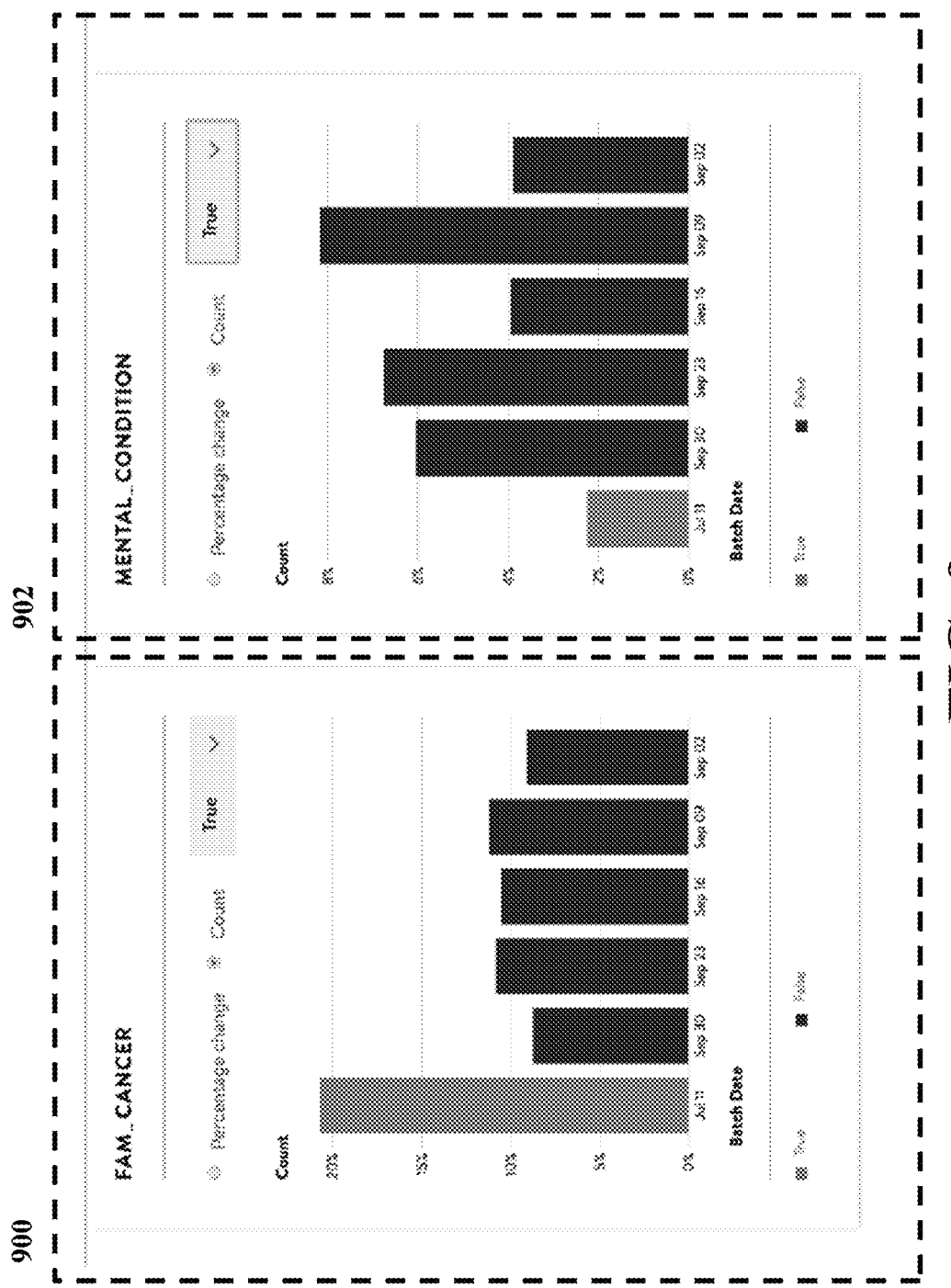
Figure 10:
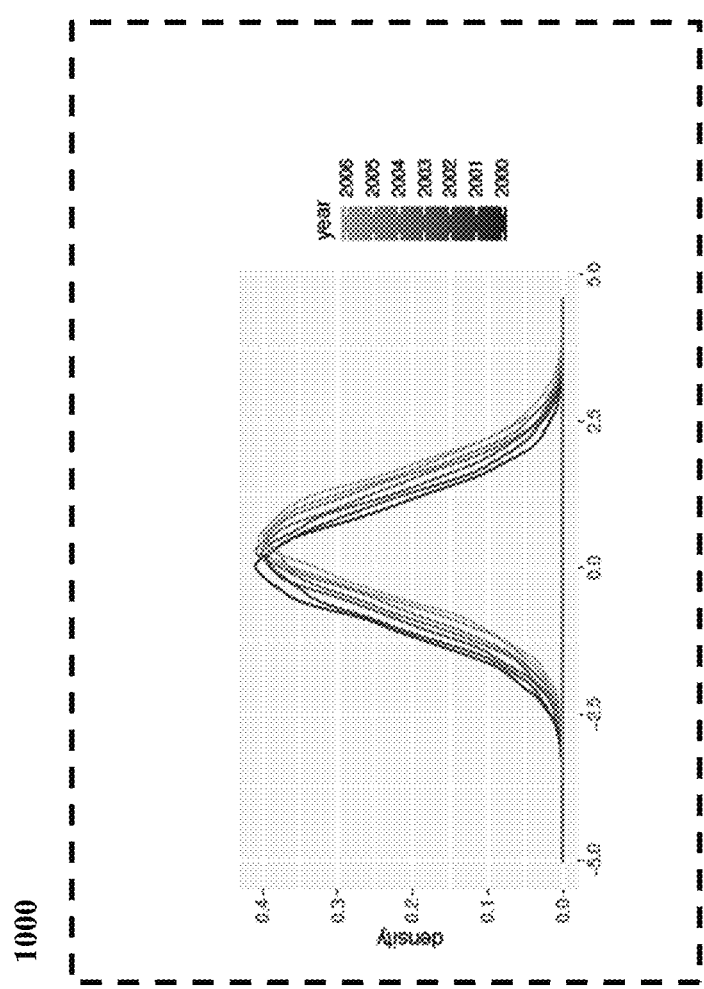

When the analytic server identifies data anomalies, the analytic server may generate an alert to the system administrator that may include various graphical user interfaces visually depicting the identified anomalies. Referring now to FIGS. 9 and 10, non-limiting examples of alert GUIs are illustrated. For instance, GUI 900 includes analysis of an artificial intelligence model that determines mortality rate for various potential customers. The analytic server compares a new batch of data (e.g., data received within a predetermined timeframe) with baseline data (historical data, such as customer data previously analyzed by the model within a predetermine timeframe).

As depicted in GUI 900, the model has ingested 20% of applicants with history of family cancer in July. Furthermore, the model has ingested only 2% of applicants with predetermined mental conditions in the same month. Using the depicted visualization techniques, the system administrator can easily determine that the above-described attributes were anomalies. For instance, the analytic server may display other batch data (data from other timeframes) alongside the anomalies and/or display them in a visually distinct manner, such that they are easily distinguishable. The analytic server may also display the anomalies in a visually distinct manner (e.g., using different colors or hatch patterns).

In another example, as depicted in chart 1000, the analytic server may display data ingested by a model for different years where the system administrator can determine whether the data ingested has changed throughout different years. Using this data, the system administrator can determine whether the model needs to be revised. For instance, if the training data is different than the data ingested by the model, then the model may output incorrect results. The data displayed within the chart 1000 may also represent the training data used to train a particular model. Therefore, the chart 1000 may be displayed in conjunction with other user interfaces described herein and described in other figures.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
  receiving, by a server, configuration information associated with a plurality of artificial intelligence data models, the configuration information comprising a set of rules associated with each artificial intelligence data model;
  receiving, by the server, a plurality of inputs associated with each of the plurality of artificial intelligence data models over a predetermined period of time;
  receiving, by the server, a plurality of outputs generated by each of the plurality of artificial intelligence data models corresponding to the plurality of inputs over the predetermined period of time; and displaying, by the server, an interactive graphical user interface on a computer, the interactive graphical user interface comprising:
- a first graphical indicator representing the configuration information associated with each artificial intelligence data model;
- a second graphical indicator representing a metric generated based on the plurality of inputs and plurality of outputs, wherein the metric is displayed in form of a graph, and wherein the computer continuously updates the graph associated with the metric by continuously receiving and using a latest input and output from each artificial intelligence data model; and
- a third graphical indicator representing an attribute of a training dataset used to train each artificial intelligence data model.

2. The server-implemented method according to claim 1, wherein each artificial intelligence data model is a neural network based mathematical model.

3. The server-implemented method according to claim 1, wherein each artificial intelligence data model is selected from a group consisting of a fuzzy logic model, a linear system model, a tree based model, a random forest regression model, a decision tree model, and a generalized additive model (GAM) model.

4. The server-implemented method according to claim 1, wherein when a difference between a first output of an artificial intelligence model using a first batch of data and a second output of the artificial intelligence model using a second batch of data satisfies a threshold, the interactive graphical user interface displays at least one of the first batch or the second batch in a visually distinct manner.

5. The server-implemented method according to claim 4, wherein the first batch and the second batch correspond to attributes ingested by the artificial intelligence model within a predetermined timeframe.

6. The server-implemented method according to claim 1, wherein when a difference between a first output of an artificial intelligence model using a first batch of data and a second output of the artificial intelligence model using a second batch of data satisfies a threshold, the server transmits an alert to a computing device.

7. The server-implemented method according to claim 6, wherein the alert is an email indicating identification of the artificial intelligence model.

8. A server comprising a processor and a non-transitory computer-readable medium containing instructions that when executed by the processor causes the processor to perform operations comprising:
receive configuration information associated with a plurality of artificial intelligence data models, the configuration information comprising a set of rules associated with each artificial intelligence data model and a version number of each artificial intelligence data model;
receive a plurality of inputs associated with each of the plurality of artificial intelligence data models over a predetermined period of time;
receive a plurality of outputs generated by each of the plurality of artificial intelligence data models corresponding to the plurality of inputs over the predetermined period of time; and
display an interactive graphical user interface on a computer, the interactive graphical user interface comprising:
- a first graphical indicator representing the configuration information associated with each artificial intelligence data model;
- a second graphical indicator representing a metric generated based on the plurality of inputs and plurality of outputs, wherein the metric is displayed in form of a graph, and wherein the computer continuously updates the graph associated with the metric by continuously receiving and using a latest input and output from each artificial intelligence data model; and
- a third graphical indicator representing an attribute of a training dataset used to train each artificial intelligence data model.

9. The server according to claim 8, wherein each artificial intelligence data model is a neural network based mathematical model.

10. The server according to claim 8, wherein each artificial intelligence data model is selected from a group consisting of a fuzzy logic model, a linear system model, a tree based model, a random forest regression model, a decision tree model, and a generalized additive model (GAM) model.

11. The server according to claim 8, wherein when a difference between a first output of an artificial intelligence model using a first batch of data and a second output of the artificial intelligence model using a second batch of data satisfies a threshold, the interactive graphical user interface displays at least one of the first batch or the second batch in a visually distinct manner.

12. The server according to claim 11, wherein the first batch and the second batch correspond to attributes ingested by the artificial intelligence model within a predetermined timeframe.

13. The server according to claim 8, wherein when a difference between a first output of an artificial intelligence model using a first batch of data and a second output of the artificial intelligence model using a second batch of data satisfies a threshold, the server transmits an alert to a computing device.

14. The server according to claim 13, wherein the alert is an email indicating identification of the artificial intelligence model.

15. A server-implemented method comprising:
receiving, by a server, configuration information associated with a plurality of artificial intelligence data models, the configuration information comprising a set of rules associated with each artificial intelligence data model and a version number of each artificial intelligence data model, each artificial intelligence data model is trained using training data;
receiving, by the server, a plurality of inputs associated with each artificial intelligence data model over a predetermined period of time;
receiving, by the server, a plurality of outputs generated by each artificial intelligence data model corresponding to the plurality of inputs over the predetermined period of time;
generating, by the server, one or more reports associated with each artificial intelligence data model showing an interrelationship between the plurality of inputs and the plurality of outputs;
displaying, by the server on an interactive dashboard interface of a computer, the one or more reports associated with each artificial intelligence data model;
apply, by the server, an evaluation rule on each metric associated with the one or more reports to determine whether the evaluation rule is satisfied;

upon determining that the evaluation rule is not satisfied, generating, by the server, one or more action items associated with each artificial intelligence data model, wherein the one or more action items comprises updating the training data associated with each artificial intelligence data model; and executing, by the server, the one or more action items to update the training data associated with each artificial intelligence data model.

16. The server-implemented method according to claim 15, further comprising:

re-training, by the server, each artificial intelligence data model using updated training data.

17. The server-implemented method according to claim 16, further comprising:

evaluating, by the server, each artificial intelligence data model by a predetermined criteria to determine whether the re-training is completed, wherein the predetermined criteria comprises desired ranges of accuracy, time, or a number of training iterations.

18. The server-implemented method according to claim 15, wherein each artificial intelligence data model is a neural network based model.

19. The server-implemented method according to claim 15, wherein each artificial intelligence data model is selected from a group consisting of a fuzzy logic model, a linear system model, a tree based model, a random forest regression model, a decision tree model, and a generalized additive model (GAM) model.

20. The server-implemented method according to claim 15, further comprising:

training, by the server, each artificial intelligence data model using the training data, the training data comprises a set of input parameters and a set of output parameters.

* * * * *